US012246550B2

(12) United States Patent
Fisher

(10) Patent No.: US 12,246,550 B2
(45) Date of Patent: Mar. 11, 2025

(54) METHODS FOR DIRECT THERMAL RECORDING MEDIA BASED ON SELECTIVE CHANGE OF STATE

(71) Applicant: Appvion, LLC, Appleton, WI (US)

(72) Inventor: Mark R. Fisher, Appleton, WI (US)

(73) Assignee: Appvion, LLC, Appleton, WI (US)

( * ) Notice: Subject to any disclaimer, the term of this patent is extended or adjusted under 35 U.S.C. 154(b) by 227 days.

(21) Appl. No.: 17/850,661

(22) Filed: Jun. 27, 2022

(65) Prior Publication Data

US 2022/0332135 A1 Oct. 20, 2022

Related U.S. Application Data

(62) Division of application No. 16/361,471, filed on Mar. 22, 2019, now Pat. No. 11,370,241.

(60) Provisional application No. 62/647,530, filed on Mar. 23, 2018.

(51) Int. Cl.
*B41M 5/36* (2006.01)
*B41M 5/42* (2006.01)

(52) U.S. Cl.
CPC .............. *B41M 5/36* (2013.01); *B41M 5/366* (2013.01); *B41M 5/42* (2013.01); *B41M 2205/04* (2013.01); *B41M 2205/12* (2013.01); *B41M 2205/38* (2013.01)

(58) Field of Classification Search
CPC .......... B41M 5/36; B41M 5/366; B41M 5/42; B41M 2205/04; B41M 2205/38
See application file for complete search history.

(56) References Cited

U.S. PATENT DOCUMENTS

| | | | |
|---|---|---|---|
| 2,574,439 | A | 11/1951 | Seymour |
| 2,739,909 | A | 3/1956 | Rosenthal |
| 2,740,895 | A | 4/1956 | Miller |
| 2,859,351 | A | 11/1958 | Clark et al. |
| 2,927,039 | A | 3/1960 | Weel |
| 2,957,791 | A | 10/1960 | Bechtold |
| 3,180,752 | A | 4/1965 | Bollinger et al. |
| 3,228,785 | A | 1/1966 | Growald et al. |

(Continued)

FOREIGN PATENT DOCUMENTS

| | | |
|---|---|---|
| GB | 1043541 | 9/1966 |
| WO | WO 2017/223198 | 12/2017 |

OTHER PUBLICATIONS

International Search Report and Written Opinion for PCT International Application No. PCT/US2019/023572, mailed Jul. 22, 2019, 15 pages.

(Continued)

*Primary Examiner* — Gerard Higgins
(74) *Attorney, Agent, or Firm* — Amundsen Davis, LLC

(57) ABSTRACT

Direct thermal recording media are designed to operate based on a thermally-induced change of state rather than a thermally-induced chemical reaction between a leuco dye and an acidic developer. The media use two types of solid scattering particles, one of which changes its state from solid to liquid during printing, and the other of which does not. The former particles, upon melting, fill spaces between the latter particles, thus eliminating or substantially reducing light scattering, which makes an underlying colorant visible at selected print locations where heat is locally applied. The media can provide high quality thermally-produced images at print speeds at least as high as 10 inches per second (ips).

16 Claims, 17 Drawing Sheets

(56) References Cited

U.S. PATENT DOCUMENTS

| | | | |
|---|---|---|---|
| 3,306,763 | A | 2/1967 | Hoge |
| 3,515,570 | A | 6/1970 | Suzuki |
| 3,539,375 | A | 11/1970 | Baum |
| 3,674,535 | A | 7/1972 | Blose et al. |
| 3,746,675 | A | 7/1973 | Blose et al. |
| 3,853,579 | A | 12/1974 | Heiser |
| 3,949,138 | A | 4/1976 | Heiser |
| 3,953,659 | A | 4/1976 | Truitt |
| 4,151,748 | A | 5/1979 | Baum |
| 4,181,771 | A | 1/1980 | Hanson et al. |
| 4,246,318 | A | 1/1981 | Baum |
| 4,370,370 | A | 1/1983 | Iwata et al. |
| 4,470,057 | A | 9/1984 | Glanz |
| 4,577,204 | A | 3/1986 | Shibata et al. |
| 5,109,153 | A | 4/1992 | Johnson et al. |
| 5,378,534 | A | 1/1995 | Kuroanagi et al. |
| 6,043,193 | A | 3/2000 | Chen et al. |
| 6,252,004 | B1 | 6/2001 | Blankenship et al. |
| 6,670,010 | B2 | 12/2003 | Nagamoto et al. |
| 6,803,088 | B2 | 10/2004 | Kaminsky et al. |
| 7,651,747 | B2 | 1/2010 | Chen et al. |
| 8,054,323 | B2 | 11/2011 | Peters et al. |
| 8,106,934 | B2 | 1/2012 | Ishimi et al. |
| 8,536,087 | B2 | 9/2013 | Harrison et al. |
| 8,598,075 | B2 | 12/2013 | Ochiai et al. |
| 9,193,208 | B2 | 11/2015 | Chung et al. |
| 9,663,650 | B2 | 5/2017 | Jhaveri |
| 9,757,968 | B1 | 9/2017 | Guzzo et al. |
| 9,932,487 | B2 | 4/2018 | Einsla et al. |
| 2006/0038871 | A1 | 2/2006 | Chen et al. |
| 2007/0065749 | A1 | 3/2007 | Kasperchik et al. |
| 2010/0245524 | A1 | 9/2010 | Peters et al. |
| 2011/0251060 | A1 | 10/2011 | Harrison et al. |
| 2011/0287930 | A1 | 11/2011 | Ochiai et al. |
| 2014/0037901 | A1 | 2/2014 | Chung et al. |
| 2014/0213691 | A1 | 7/2014 | Jhaveri |
| 2016/0001583 | A1 | 1/2016 | Iwata et al. |
| 2017/0337851 | A1 | 11/2017 | Guzzo et al. |

OTHER PUBLICATIONS

Third Party Communication submitted to the European Patent Office on Nov. 12, 2020 against EP application 19715736.5, 48 pages.

METHODS FOR DIRECT THERMAL RECORDING MEDIA BASED ON SELECTIVE CHANGE OF STATE

CROSS-REFERENCE TO RELATED APPLICATIONS

This application is a divisional under 35 U.S.C. § 120 of U.S. Ser. No. 16/361,471, "Direct Thermal Recording Media Based on Selective Change of State", filed Mar. 22, 2019 and now issued as U.S. Pat. No. 11,370,241, which claims priority under 35 U.S.C. § 119 (e) to provisional patent application U.S. Ser. No. 62/647,530, "Direct Thermal Recording Media Based on Selective Change of State", filed Mar. 23, 2018, the contents of all of which are incorporated herein by reference.

FIELD OF THE INVENTION

The present invention relates to direct thermal recording media, with particular application to direct thermal recording media that incorporate neither a leuco dye nor an acidic developer to provide a heat-activated printing mechanism. The invention also pertains to related methods, systems, and articles.

BACKGROUND OF THE INVENTION

Numerous types of direct thermal recording media, sometimes referred to as thermally-responsive record materials, are known. See, for example, U.S. Pat. No. 3,539,375 (Baum); U.S. Pat. No. 3,674,535 (Blose et al.); U.S. Pat. No. 3,746,675 (Blose et al.); U.S. Pat. No. 4,151,748 (Baum); U.S. Pat. No. 4,181,771 (Hanson et al); U.S. Pat. No. 4,246,318 (Baum); and U.S. Pat. No. 4,470,057 (Glanz). In these cases, basic colorless or lightly colored chromogenic material, such as a leuco dye, and an acidic color developer material are contained in a coating on a substrate which, when heated to a suitable temperature, melts or softens to permit the materials to react, thereby producing a colored mark or image. Thermally-responsive record materials have characteristic thermal response, desirably producing a colored image of sufficient intensity upon selective thermal exposure.

Some direct thermal recording media that do not utilize leuco dyes or acidic color developers are also known. For example, US 2017/0337851 (Guzzo et al.) discusses embodiments in which a reveal coat layer includes an acrylic-based composition including light-scattering particles that cause the reveal coat layer to be opaque in a first state and transparent in a second state, the application of at least one of heat and pressure from a print head causing the reveal coat layer to transition from the first state to the second state, thereby enabling at least one color of an ink layer to be visible through the reveal coat layer. The reveal coat layer uses small diameter hollow spheres that scatter light. When heat or pressure is applied to the reveal coat, the spheres are said to flatten and lose their spherical shapes, causing the reveal coat to become transparent.

In another example, U.S. Pat. No. 9,193,208 (Chung et al.) discusses recording materials including a support and disposed thereon at least one layer including certain core/shell polymeric particles, the particles having, when dry, at least one void, and an opacity reducer is provided. During printing, the polymeric particles including a void are believed to collapse in the area where the heat and pressure was applied by the thermal head, and the collapsed portions of the layer become transparent showing the underlying black color where it was printed.

SUMMARY OF THE INVENTION

Alternatives to leuco dye-based thermal recording materials may be desirable for a number of reasons, including recent supply chain concerns with some dye-related source materials, and the constant push to adopt products with simpler, and even more environmentally friendly, chemistries. And although at least one non-leuco dye-based thermal recording material is currently available on the market, we have found such products to have marginal performance, at best, when tested with standard thermal printing devices.

A need therefore exists in the industry for alternative thermally responsive record materials. Such alternative materials would preferably be suitable for use in diverse applications such as labeling, facsimile, point of sale (POS) printing, printing of tags, and pressure sensitive labels. The alternative materials would also preferably be compatible with thermal printers whose print speed is at least 6, or 8, or even 10 inches per second (ips).

We have developed a new family of direct thermal recording materials or media that can be tailored to satisfy one, some, or all of these needs. The disclosed direct thermal recording media are designed to operate based on a thermally-induced change of state rather than a thermally-induced chemical reaction between a leuco dye and an acidic developer. The media use two types of solid scattering particles, one of which changes its state from solid to liquid during printing, and the other of which does not. The former particles, upon melting, fill spaces between the latter particles, thus eliminating or substantially reducing light scattering, which makes an underlying colorant visible at selected print locations where heat is locally applied. The media can provide high quality thermally-produced images at print speeds at least as high as 10 inches per second (ips).

We therefore disclose herein, among other things, recording media that include a substrate, a first light-scattering layer carried by the substrate and including first solid scattering particles having a first melting point. Also included is a plurality of second solid scattering particles proximate the first light-scattering layer, the second solid scattering particles having a second melting point lower than the first melting point. The first light-scattering layer is porous, and the second solid scattering particles are disposed to, upon melting, fill spaces between the first solid scattering particles. A thermal insulating layer may be included between the first light-scattering layer and the substrate. A colorant may also be included beneath the first light-scattering layer and in, on, or under the thermal insulating layer.

Applying sufficient heat or energy at selected print locations to a side of the recording medium on which the first light-scattering layer resides can cause the second solid scattering particles, but not the first solid scattering particles, to melt at the selected print locations, such that the second solid scattering particles, upon melting, fill spaces between the first solid scattering particles to render the first light-scattering layer substantially transparent in the selected print locations. The colorant may become visible at the selected print locations but remain obscured by other portions of the first light-scattering layer. A print quality of the recording medium when used with a thermal printer energy setting of 11.7 $mJ/mm^2$ at a print speed of 6, or 8, or 10 inches per second (ips) may be characterized by an ANSI value of at least 1.5. The first solid scattering particles may have a first average size in a range from 0.2 to 1 micrometer, and the second solid scattering particles may have a second average size which is also in the range from 0.2 to 1 micrometer. The second melting point may be at least 80° C. or at least 90° C., or in a range from 80 to 150° C., and the first melting point may be at least 50° C. greater than the second melting point.

In some cases, the second solid scattering particles are dispersed throughout the first light-scattering layer. The first solid scattering particles, the second solid scattering particles, and a binder may make up at least 95% (total dry solids) of the first light-scattering layer. The first light-scattering layer may consist essentially of the first solid scattering particles, the second solid scattering particles, the binder, and an optional lubricant. The first light-scattering layer may be exposed to air, and may contain hollow particles from 5% to 20% (total dry solids). The medium may also include a topcoat exposed to air, and disposed directly or indirectly on the first light-scattering layer. The first light-scattering layer may contain substantially no hollow particles. The first light-scattering layer may be substantially devoid of leuco dyes and acidic developers.

In some cases, the second solid scattering particles may be disposed in a second light-scattering layer adjacent the first light-scattering layer. The first and second light-scattering layers may both be substantially devoid of leuco dyes and acidic developers.

The second solid scattering particles may comprise a non-polymeric crystalline organic material, e.g., at least one of diphenyl sulfone (DPS), diphenoxyethane (DPE), ethylene glycol m-tolyl ether (EGTE), and β-naphthylbenzylether (BON). The first solid scattering particles may be polymeric or inorganic, e.g., they may comprise at least one of aluminum trihydrate (ATH), calcium carbonate, polyethylene, polystyrene, and silica. The first solid scattering particles may not be soluble in acetone. Neither the first solid scattering particles nor the second solid scattering particles may be chemically reactive. Neither the first solid scattering particles nor the second solid scattering particles may contain any chemical functional group. A ratio of the first solid scattering particles to the second solid scattering particles, measured in terms of total dry solids, may be in a range from 1 to 3, or 1.5 to 2.5. The first solid scattering particles may have a drupelet morphology, or other complex morphology.

We disclose numerous related methods, systems, and articles, many of which are summarized in the items list provided below near the end of the Detailed Description section.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

As noted above, we have developed a new family of non-leuco dye-based thermally responsive recording media that can provide high quality thermally generated images when used with conventional POS thermal printers, thermal label printers, and the like. The disclosed recording media preferably employ no, or substantially no, leuco dyes or acidic developers. Some embodiments also employ no, or substantially no, hollow sphere particles in the light-scattering layer(s) of the recording medium (as distinguished from a thermal insulating layer which may be present between the light scattering layer(s) and the substrate, which thermal insulating layer may contain a significant number of hollow sphere particles), while other embodiments may employ a limited amount of hollow sphere particles in such layer(s). The new recording media operate based on a thermally-induced change of state rather than a thermally-induced chemical reaction. The media use two types of solid scattering particles, one of which changes its state from solid to liquid during printing, and the other of which does not. The former particles, upon melting, fill spaces between the latter particles, thus eliminating or substantially reducing light scattering at the surfaces of such particles, making an underlying colorant visible at selected print locations where heat is locally applied. The media can provide high quality thermally-produced images, and in some embodiments such images can be formed at print speeds at least as high as 10 inches per second (ips).

Figure 1A:
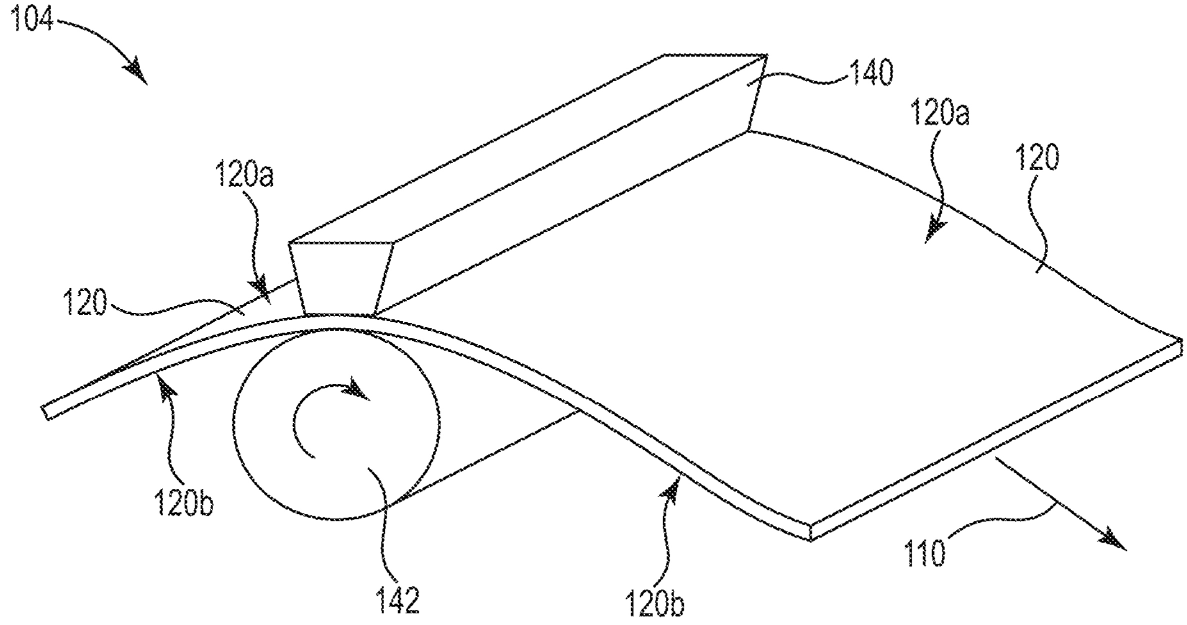
FIG. 1A is a schematic perspective view of a direct thermal printing system in which a direct thermal recording medium passes across a thermal print head to provide a thermally printed image.

A schematic representation of a printing system employing a direct thermal recording medium as disclosed herein is shown in FIG. 1A. In the figure, a printing system 104 includes a thermal print head 140 positioned close to a rotating roller 142. A piece, sheet, or roll of direct thermal recording medium or material 120 is fed into the system and pulled along a feed direction 110 past, and while being pressed against, the print head 140. The recording material 120 is preferably a thin, flexible, sheet-like material composed of a base paper or other substrate to which one or more coatings have been applied.

The recording material 120 has first and second opposed major surfaces 120*a*, 120*b*. In many but not all cases, the recording material 120 is one-sided or asymmetric, such that thermal printing can be performed on one major surface, but not the opposite major surface, of the recording material. In FIG. 1A, the first major surface 120*a* corresponds to the side of the recording material 120 that is adapted for thermal printing. The first major surface 120*a* may press against and slide across the underside of the print head 140 as the recording material passes through the printing system 104. A controller (not shown) controls the print head 140 to selectively and rapidly modulate small heating elements on the underside of the print head in a manner consistent with the desired image, taking into account the constant speed of the recording material 120 along the feed direction 110. As explained further below, coating(s) of the recording material 120 are designed to bring about a change in color or appearance at the selected locations where the print head provides the necessary heat. The changes in color at the selected print locations provide the desired thermally printed image.

Figure 1B:
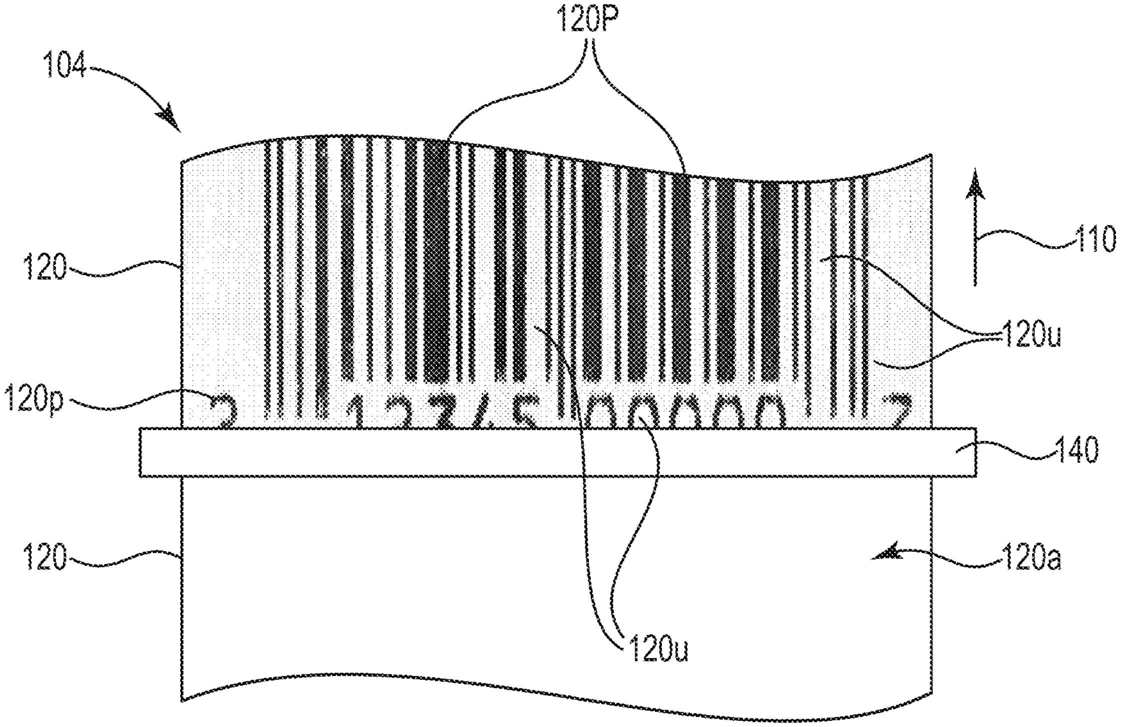
FIG. 1B is a schematic top view of the printing system of FIG. 1A, this view also illustrating a representative thermal image being formed on the recording medium.

FIG. 1B is a schematic top view of the printing system 104 of FIG. 1A, where like elements have like reference numbers and will not be described again to avoid needless repetition. In FIG. 1B, printed portions 120*p* and unprinted portions 120*u* of the recording material 120 are identified in the context of a representative thermal image being formed on the recording medium 120. In the figure, the representative thermal image is a specific bar code pattern and set of alphanumeric characters; however, any other desired image or pattern can instead be printed, with appropriate modulation control of the print head. The printed portions 120*p* are locations on the recording material 120 where the thermal print head 140 provided sufficient heat, during the short time period when the location in question was exposed to heating element(s) of the print head, to accomplish the transformation of the appearance of the recording material from a background color to a foreground or printed color. In most cases, the background color is preferably white or near-white, and the printed color is preferably black or another dark color to provide good contrast with the lighter background color. Unprinted portions 120*u* of the recording material 120 have the same white or bright color as the overall appearance or color of the first major surface 120*a* before printing.

Figure 2A:
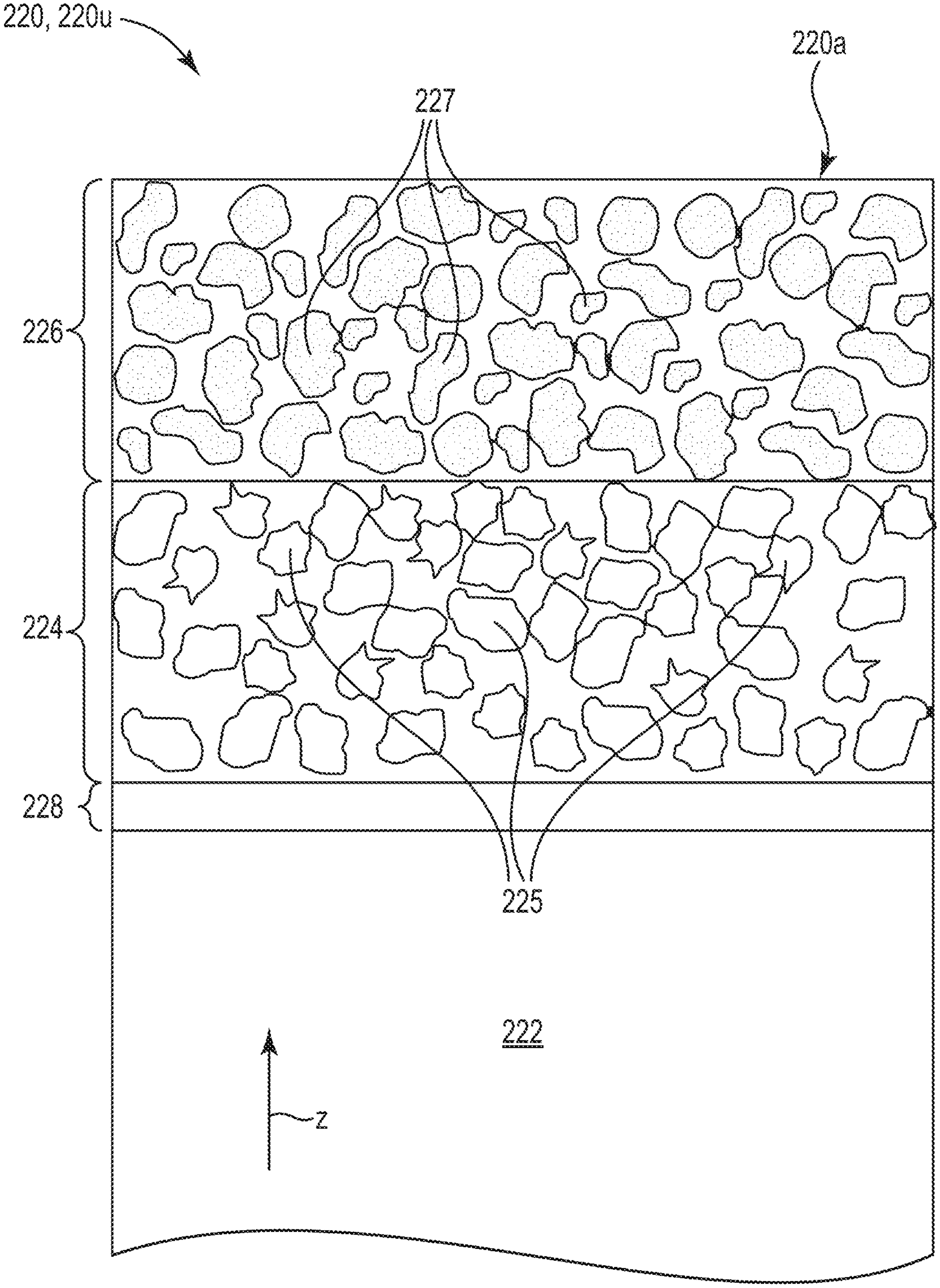
FIG. 2A is a schematic front elevation view, which also serves as a schematic cross-sectional view, of a recording material or medium, or portion thereof, having a so-called bi-layer construction.

A schematic side or sectional view of a non-leuco dye-based direct thermal recording material capable of exhibiting the functionality of FIGS. 1A and 1B is shown in FIG. 2A. In this figure and other figures showing side elevation or cross-sectional views of the product, relative layer thicknesses may not be to scale. The figure shows only a narrow slice or section of a direct thermal recording material 220, which would typically extend along a plane perpendicular to the thickness axis z of the material. The recording material 220 is intended to represent the recording material after manufacture but before ever being processed through a thermal printer. The recording material of FIG. 2A may however also represent the recording material after processing through a thermal printer, but at a location that was not substantially subjected to heat from the print head. FIG. 2A may thus also be considered to represent an unprinted portion 220*u* of a direct thermal recording material. The recording material 220 has opposed major surfaces exposed to air, one of which is labeled as major surface 220*a*.

The recording material 220 includes a substrate 222, a light-scattering layer 224, and a thermal insulating layer 228 between the light-scattering layer 224 and the substrate 222. A colorant (not shown separately) is preferably included in or on the thermal insulating layer 228. The light-scattering layer includes first solid scattering particles 225. The recording material 220 also includes second solid scattering particles 227 proximate the light-scattering layer 224.

The first and second solid scattering particles have different melting points, and the two particle types are physically close enough to each other such that: (a) when sufficient heat is applied to the top side of the recording material (from the perspective of FIG. 2A), the second solid scattering particles 227, but not the first solid scattering particles 225, melt and fill spaces between the first solid scattering particles, which renders the light-scattering layer 224 substantially transparent; or (b) when passing the recording material through a conventional thermal printer, the second solid scattering particles 227, but not the first solid scattering particles 225, rapidly melt and, upon melting, fill spaces between the first solid scattering particles to render the light-scattering layer 224 substantially transparent; or both (a) and (b). In practice, the heating is usually applied only at selected print locations to create a desired image.

In the embodiment of FIG. 2A, the second solid scattering particles 227 are physically separated from the first solid scattering particles 225, such that they form a light-scattering layer 226 that is distinct from, but adjacent to, the light-scattering layer 224. Since the recording material 220 has two light-scattering layers, it may be said to have a bi-layer construction.

The substrate 222 is preferably thin, substantially planar, and flexible. The substrate 222 has a thickness defined by its opposed major surfaces, one of which is shown in FIG. 2A. The substrate may preferably be or comprise a cellulose material, such as a conventional paper. The paper may have a basis weight in a range from 35 to 200 g/m$^2$, but other suitable basis weights may also be used. The paper may also be treated with one or more agents, such as a surface sizing agent. Uncoated base papers, including unsized, conventionally sized, and lightly treated base papers, can be used. Alternatively, the substrate 222 may be or include a polymeric film, whether single-layer or multilayer in construction. Exemplary polymeric films include polypropylene films, including biaxially oriented polypropylene (BOPP) films. The substrate 222 may be simple in construction, and devoid of glossy coatings, or of other substantial, functional coatings. The substrate 222 may, for example, be substantially uniform in composition throughout its thickness, rather than a multilayered construction or material to which one or more separate, functional coatings have already been applied. In some cases, however, it may be desirable to treat, prepare, or otherwise work the substrate 222 in preparation for coating onto it the other layers shown in the figure. The substrate 222 and its major surfaces may also be light-diffusive and opaque in character.

The thermal insulating layer 228 may in some cases be characterized or described as a separator layer, heat-reflective layer, isolation layer, or prime coat. As indicated by its name, the layer 228 provides a degree of thermal insulation between the light-scattering layer 224 and the substrate 222. Such thermal insulation promotes print quality, print speed, or both, by ensuring that heat delivered by the thermal print head to the light-scattering layer 224 or other coatings is not substantially lost by thermal conduction to the more massive substrate 222. The thermal conductivity of the layer 228 is thus preferably less than both the thermal conductivity of the light-scattering layer 224, and the thermal conductivity of the substrate 222.

The thermal insulating layer 228 may comprise hollow sphere pigments, such as product code Ropaque™ TH-2000 or TH-500EF available from The Dow Chemical Company, or other suitable materials. The thermal insulating layer 228 can be made by a process in which a dispersion is coated onto the surface of the substrate, and then dried. In some cases, the thermal insulating layer—including the layer 228 of FIGS. 2A-2D, the layer 328 of FIG. 3, the layer 428 of FIG. 4, and the layer 528 of FIG. 5—may be eliminated and omitted from the product construction. When included as part of the recording material, the thermal insulating layer may have a thickness in a range from 2 to 12 μm, or other suitable thicknesses.

Carbon black or other suitable colorants can be included in or on the thermal insulating layer 228. Colorants that may be suitable are dependent on product design requirements, and may include any one or more of: carbon black; Leuco Black Sulfur 1; Phthalo blue; and any other suitable dye or pigment. In some cases the colorant(s) can be included in the layer 228 itself, e.g., dispersed throughout the thickness of the coating. In other cases, the colorant(s) can be included as a separate layer or coating atop the thermal insulating layer 228, between the layer 228 (if present) and the light-scattering layer 224. In still other cases, one or more first colorants can be included in the layer 228, and one or more second colorants, which may be the same as or different from the first colorant(s), may be included on the layer 228. In general, the colorant provides an appearance, hue, or color that differs substantially from that of unprinted portions, or background areas, of the thermal recording material 220, to provide sufficient visual contrast between printed and unprinted portions to make the printed image observable to a user.

The light-scattering layer 224 of the recording material 220 includes the first solid scattering particles 225, which differ in composition from the second solid scattering particles 227. The particles 225 are made of a light-transmissive material, but when they are immersed in air, one or more of reflection, refraction, and diffraction at the surfaces of the particles causes them to be strong scatterers of incident visible light. The sizes of the particles 225 may also be chosen to enhance visible light scattering when immersed in air. In this regard, the particles 225 may be tailored to have an average diameter in a range from 0.2 to 1 micrometer. As indicated by their name, the particles 225 are solid rather than hollow. Compared to hollow particles, with all other factors being equal, solid particles conduct heat better, and solid particles transmit light better (scatter light less) when immersed in a material of similar refractive index.

The particles 225 may be regularly shaped or irregularly shaped. Examples of regularly shaped particles are solid spherical microbeads. An example of irregularly shaped particles is a material that has been ground or pulverized, and then separated using a sieving process or the like to provide the desired size distribution. The light-transmissive material of which the particles 225 are made is preferably of relatively high melting point, such that the particles 225 do not substantially flatten, collapse, melt, or otherwise deform under the action of the thermal print head during printing. In this way, the particles 225 help provide mechanical stability for the light-scattering layer 224 during printing. The particles 225 may for example have a melting point that is at least 50° C. greater than that of the second solid scattering particles 227. Exemplary materials for the particles 225 include polymers and inorganic materials, thermoplastics, materials that are not chemically reactive, and materials that do not contain any chemical functional group. Specific exemplary materials may include one or more of aluminum trihydrate (ATH), calcium carbonate, polyethylene, polystyrene, and silica. In one example, the first solid scattering particles 225 may be or comprise solid spherical polystyrene particles of average diameter 0.22 μm, commercially available from Trinseo LLC under product code Plastic Pigment 756A.

The particles 225 are preferably held together in the layer 224 with a suitable binder material. However, only a small amount of the binder material is preferably used so the light-scattering layer 224 has a morphology that is microscopically porous. By making the layer 224 porous, the first solid scattering particles 225 can remain predominantly exposed to air to promote light scattering, and furthermore, liquid material from the melted second solid scattering particles 227 can rapidly wick into and infiltrate the layer 224, for faster responsiveness during printing. A layer can thus be considered porous when it includes a multitude of microscopic gaps between constituent particles that make up the layer. The light-scattering layer 224 may have a thickness in a range from 4 to 20 μm, or other suitable thicknesses.

Adjacent to, and preferably in contact with, the layer 224 is another light-scattering layer 226, which includes the second solid scattering particles 227. Like the particles 225, the particles 227 are also solid rather than hollow, and are also composed of a light-transmissive material. And like the particles 225, the particles 227, when immersed in air, also scatter visible light by one or more of reflection, refraction, and diffraction at the surfaces of the particles. The sizes of the particles 227 may be chosen to optimize or enhance one or both of thermal response time (i.e., minimize or reduce the time needed to melt the particles for a given delivered amount of heat) and visible light scattering. In this regard the particles 227 may preferably have an average size that is similar to or comparable to that of the particles 225. For example, the particles 227 may be tailored to have an average diameter in a range from 0.2 to 1 micrometer.

The particles 227 may be regularly shaped or irregularly shaped. Examples of regularly shaped particles are solid spherical microbeads. An example of irregularly shaped particles is a material that has been ground or pulverized, and then separated using a sieving process or the like to provide the desired size distribution. The light-transmissive material of which the particles 227 are made preferably has a melting point of at least 90° C., but this melting point is also preferably at least 50° C. less than that of the first particles 225.

Light-transmissive materials that are organic, crystalline, and non-polymeric (non-polymeric crystalline organic materials and compounds) are particularly useful due to their ability to rapidly melt. The melting process is accelerated in such materials relative to polymer materials due to the absence of any glass transition temperature, Tg. Exemplary materials for the particles 227 include non-polymeric crystalline organic compounds or materials, materials that are not chemically reactive, materials that do not contain any chemical functional group, and non-thermoplastic materials. Specific exemplary materials may include one or more of diphenyl sulfone (DPS), diphenoxyethane (DPE), ethylene glycol m-tolyl ether (EGTE), and β-naphthylbenzylether (BON). However, in some applications, depending on material cost, availability, or other factors, the second solid scattering particles 227 may be composed of a suitable thermoplastic material or other polymer material, with a suitably low melting point, rather than the more generally preferred non-polymeric materials.

The particles 227 may be held together in the layer 226 with a suitable binder material, and the layer 226 is preferably porous. The light-scattering layer 227 may have a thickness in a range from 4 to 20 μm or other suitable thicknesses.

Figure 2B:
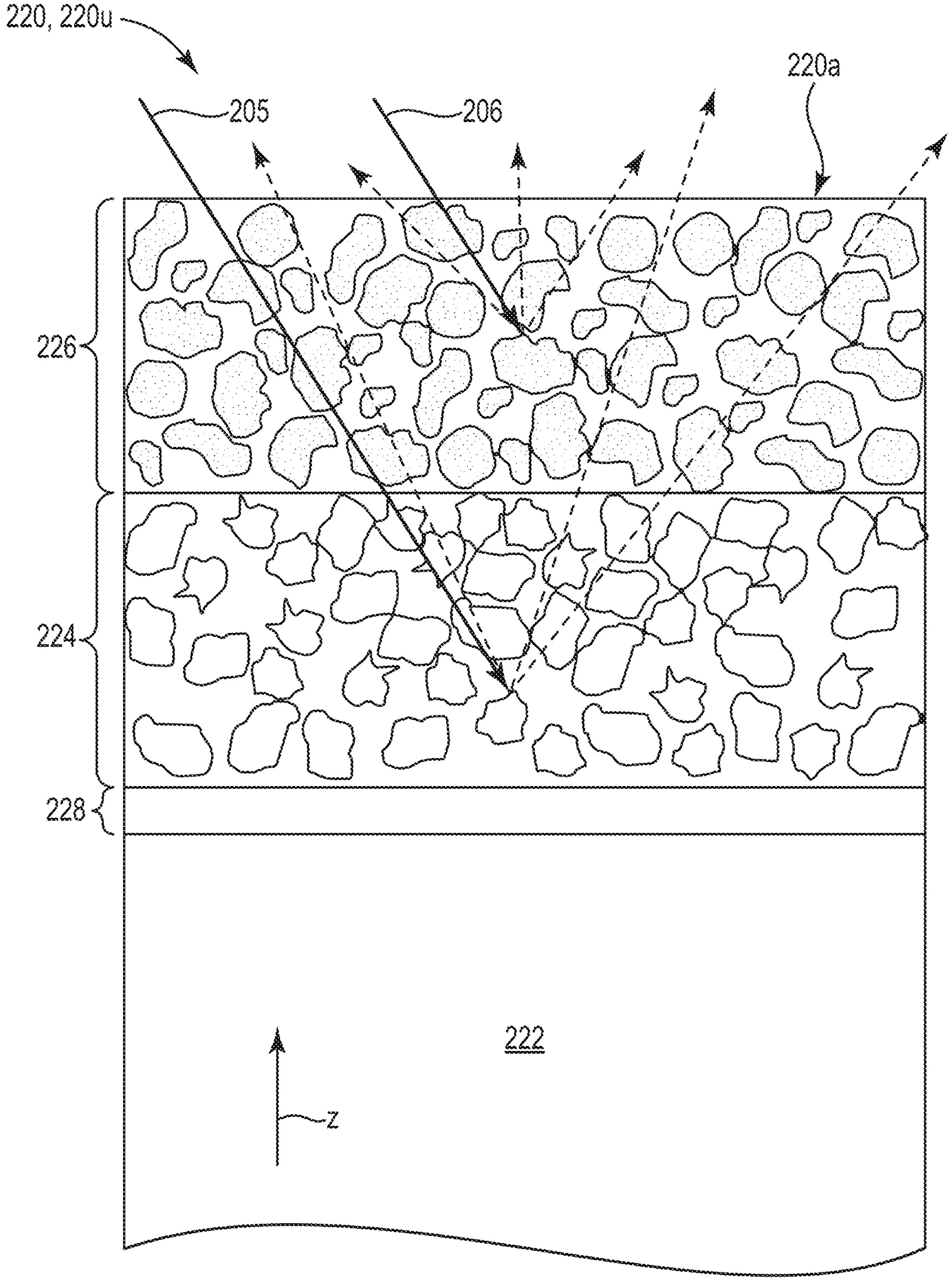
FIG. 2B is a schematic view of the recording medium of FIG. 2A, with simplified light rays drawn to illustrate the light-scattering nature of some of the layers and particles therein.

The same direct thermal recording material 220 (or unprinted portion thereof **220*u*) shown in FIG. 2A is reproduced in FIG. 2B, along with simplified representations of visible light incident on the product at the exposed major surface 220*a*. A first visible light ray 205 propagates through the outer light-scattering layer 226 and reaches the inner light-scattering layer 224. There, it encounters one or more of the first solid scattering particles 225 and is scattered in many directions by one or more of reflection, refraction, and diffraction at surface(s) of the particle(s) 225 exposed to air. A second visible light ray 206 propagates only part of the way through the outer light-scattering layer 226, and encounters in that layer 226 one or more of the second solid scattering particles 227. This encounter results again in light scattered in many directions by one or more of reflection, refraction, and diffraction at surface(s) of the particle(s) 227 exposed to air. Of course, a given light ray may experience multiple scattering events as it propagates through the layer(s) 224, 226**.

As a result of the light scattering by the particles 225, 227, the colorant disposed in or on the thermal insulating layer 228 is not substantially visible to an observer located on a side of the recording material 220 corresponding to the major surface **220*a*. Stated differently, such an observer, when looking at or towards the major surface 220*a* of the recording material, would see only the white or light-colored appearance created by the scattering action of the particles 225, 227, rather than the black or dark-colored appearance of the underlying colorant. The white or lighter appearance may be referred to as the background color of the recording material 220**.

Figure 2C:
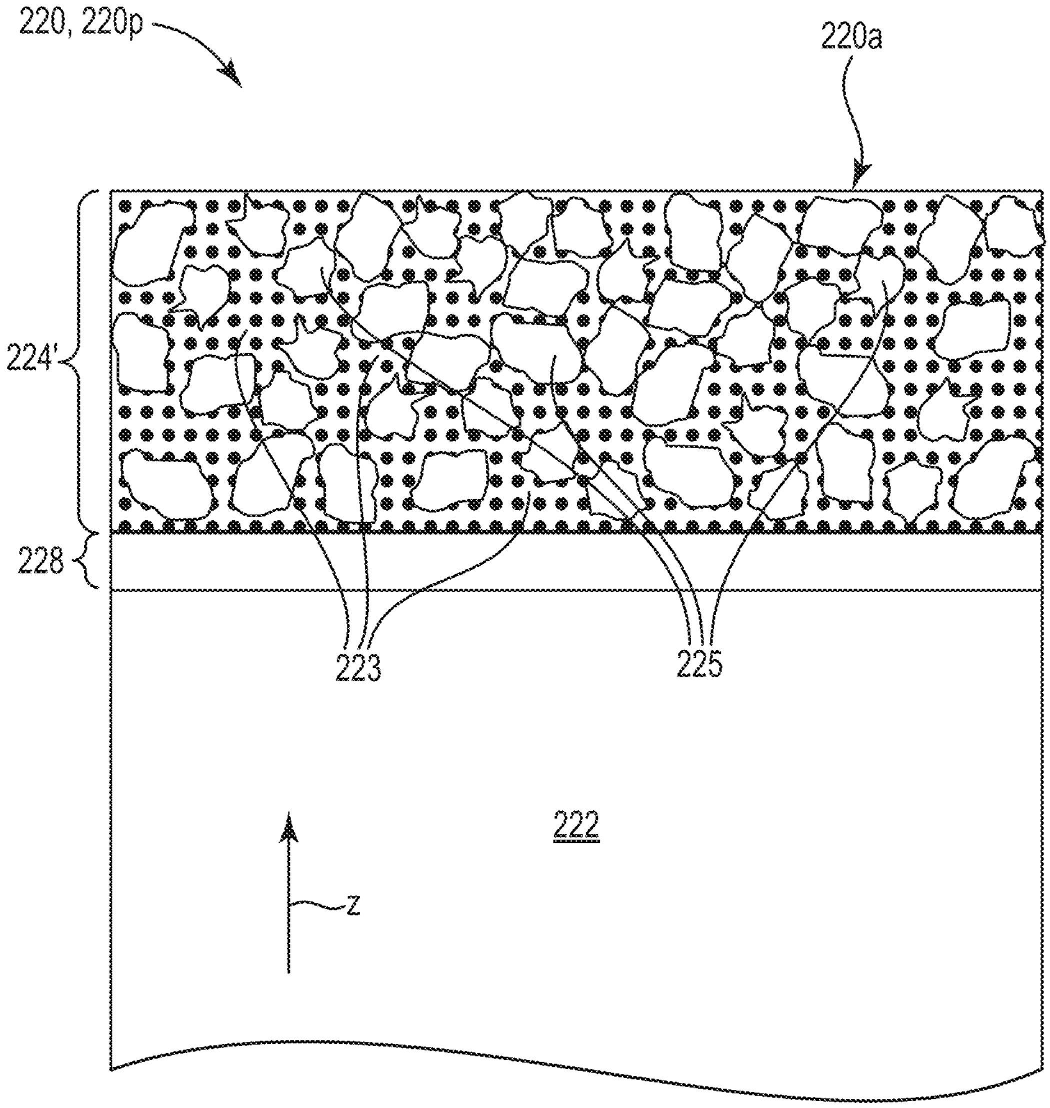
FIG. 2C is a schematic view of the recording medium of FIG. 2A after being modified by treatment with sufficient heat to melt the low melting point solid scattering particles but not the higher melting point solid scattering particles.

The direct thermal recording material 220 undergoes a transformation when subjected to sufficient heat and pressure, for a sufficient amount of time, from a thermal print head such as print head 140. In this transformation, the side of the recording medium on which the first light-scattering layer is disposed is heated to a temperature between the melting points of the particles 225, 227, such that only the second particles 227 melt. The first particles 225 preferably do not substantially melt, flatten, collapse, or otherwise deform. Due to the proximity of the second particles 227 to the first particles 225 and the porosity of the first light-scattering layer 224, the melted particles rapidly flow into and fill some or substantially all of the spaces between the first particles 225. Upon cooling (after passing the thermal print head), the melted particles form a solid matrix material 223 as shown in FIG. 2C. Comparison of FIG. 2C with FIGS. 2A, 2B illustrates that the transformation is characterized by the elimination of the (outer) light-scattering layer 226, and a conversion of the particles 227 from that layer into the matrix material 223 in the (inner) light-scattering layer 224. In practice, the light-scattering layer 226 may not be entirely eliminated, and only a portion of the second particles 227 may melt, and may fill only some of the spaces between the first particles 225.

The portion of the direct thermal recording material 220 that undergoes the transformation can be referred to as a printed portion of the recording material. As such, the recording material 220 is also labeled 220*p* in FIG. 2C. Furthermore, the light-scattering layer originally labeled 224 in FIGS. 2A and 2B is labeled 224' in FIG. 2C to reflect the fact that it has been modified by the addition of the matrix material 223.

The matrix material 223 is of course composed of the same light-transmissive material that originally formed the second solid scattering particles 227 (FIGS. 2A, 2B). This material is selected to have a refractive index for visible light that is closer to the refractive index of the first particles 225 than air. Stated differently, if n1 is the visible light refractive index for the first particles 225, and n2 is the visible light refractive index for the second particles 227 (and thus also for the matrix material 223), then $|n2-n1|<n1$. For some material choices, the visible light refractive indices for the two particle types may be the same or nearly the same, such that $|n2-n1|\approx 0$. In any of these cases, the reduced refractive index difference causes the reflectivity at the outer surfaces of the first particles 225 to be significantly reduced, which in turn greatly reduces—and in some cases substantially eliminates—the light scattering behavior of the first particles 225. As a result, the modified layer 224' may exhibit little or no light scattering, such that it becomes substantially transparent. This is illustrated in FIG. 2D.

Figure 2D:
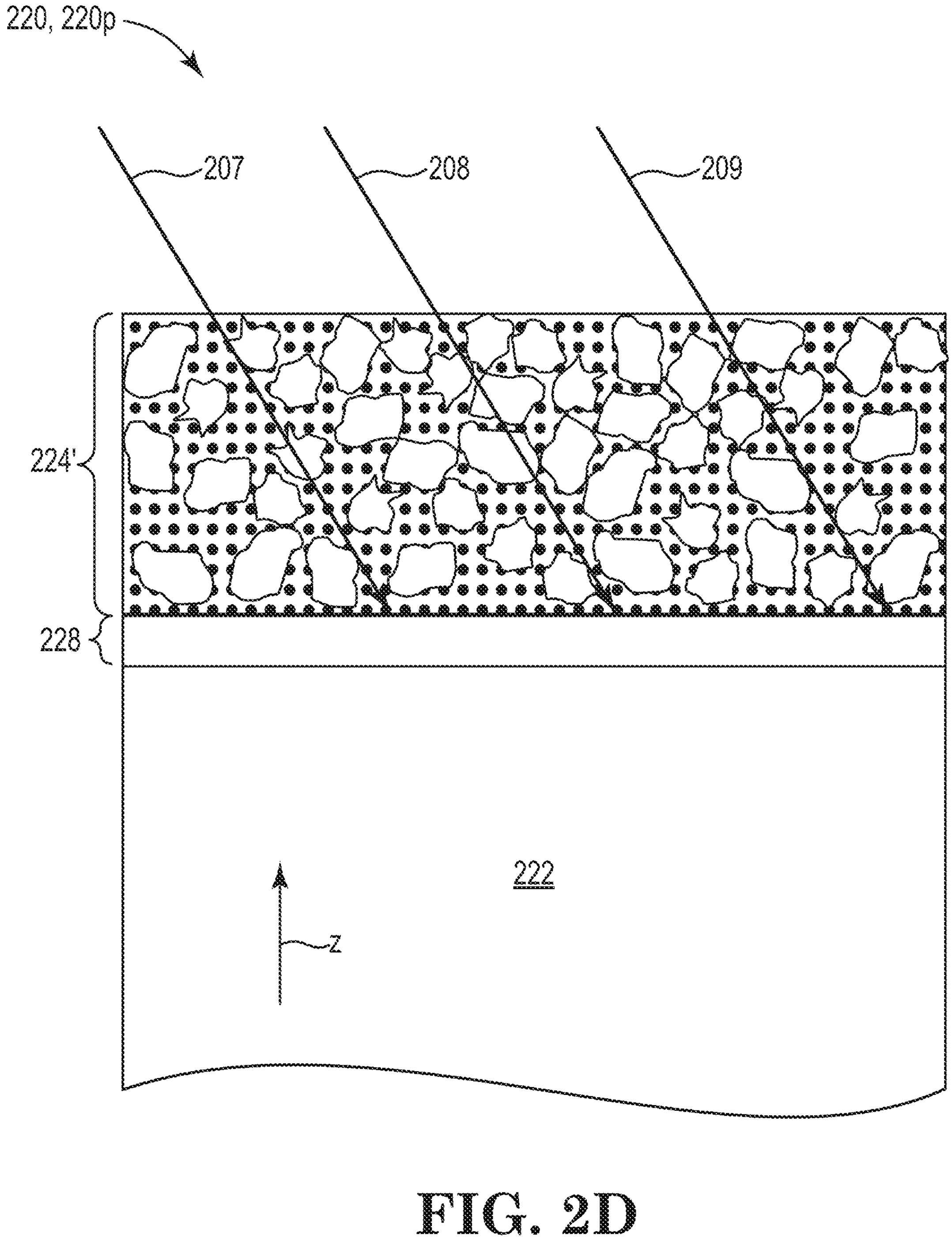
FIG. 2D is a schematic view of the modified recording medium of FIG. 2C, with simplified light rays drawn to illustrate how the light-scattering layer has become substantially transparent.

The same direct thermal recording material 220 (or printed portion thereof 220*p*) shown in FIG. 2C is reproduced in FIG. 2D, along with simplified representations of visible light incident on the product at the exposed major surface. First, second, and third visible light rays 207, 208, 209 strike the outer major surface and propagate through the modified layer 224'. Little or no scattering of the light rays occurs despite the presence of the first particles 225 in the layer 224', for the reasons discussed above. As a result, the light rays reach, and impinge upon, the colorant which is present in or on the thermal insulating layer 228. This renders the colorant clearly visible as a dark mark or area, on an otherwise white or light background, to an observer or user of the recording material 220.

Figure 3:
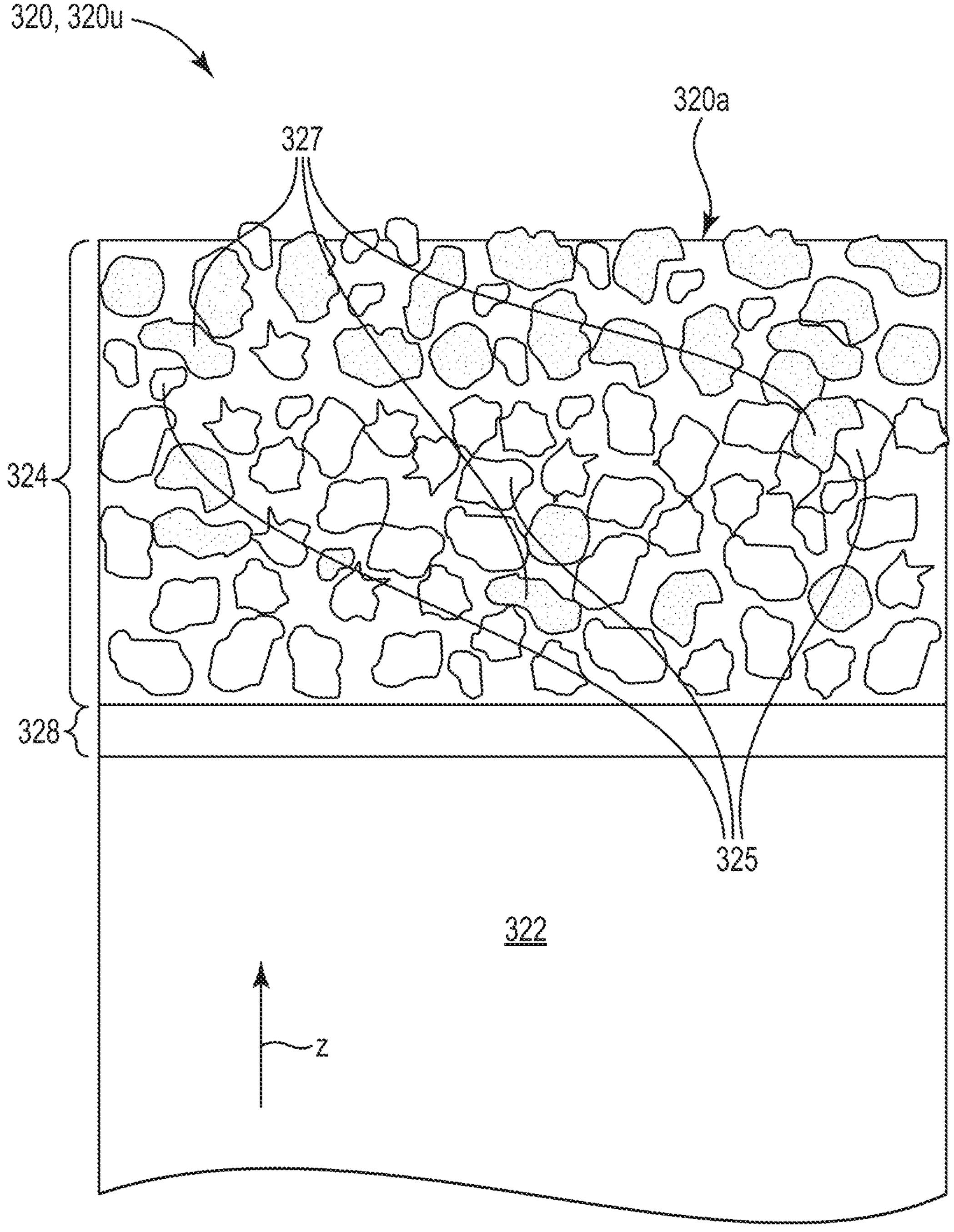
FIG. 3 is a schematic front elevation view, which also serves as a schematic cross-sectional view, of a recording material or medium, or portion thereof, having a so-called monolayer construction.

In the embodiment of FIG. 2A, the first and second solid scattering particles 225, 227 are separated into distinct but adjacent light-scattering layers. The embodiment of FIG. 2A may thus be said to have a bi-layer construction. An alternative to this is to mix the two types of scattering particles together in a single layer, i.e., in a monolayer. Such an approach can simplify the manufacturing process by eliminating one of the coating steps. A direct thermal recording material 320 having this single light-scattering layer construction is shown in FIG. 3. The recording material 320 is intended to represent the recording material after manufacture but before ever being processed through a thermal printer. The recording material of FIG. 3 may however also represent the recording material after processing through a thermal printer, but at a location that was not substantially subjected to heat from the print head. FIG. 3 may thus also be considered to represent an unprinted portion 320*u* of a direct thermal recording material. The recording material 320 has opposed major surfaces exposed to air, one of which is labeled as major surface 320*a*.

The recording material 320 (320*u*) includes a substrate 322, a light-scattering layer 324, and a thermal insulating layer 328 between the light-scattering layer 324 and the substrate 322. A colorant (not shown separately) is preferably included in or on the thermal insulating layer 328. The light-scattering layer includes first solid scattering particles 325. The recording material 320 also includes second solid scattering particles 327 proximate the light-scattering layer 324. In this case, the second solid scattering particles 327 are included in, and dispersed throughout, the light-scattering layer 324 along with the first particles 325, rather than being in a separate layer.

Features or elements of the recording material 320 that have counterparts in the recording material 220 of FIG. 2A may be the same as or similar to such counterpart or corresponding elements. Thus, for example, the substrate 322, first solid scattering particles 325, second solid scattering particles 327, and thermal insulating layer 328 may be the same as or similar to the substrate 222, first particles 225, second particles 227, and insulating layer 228, respectively, discussed above.

Furthermore, the light-scattering layer 324 may also be similar to the layer 224 discussed above, except that the second solid scattering particles are present in the layer 324. The particles 325, 327 may thus be held together in the layer 324 with a suitable binder material, and the light-scattering layer 324 may have a porous morphology. By making the layer 324 porous, both types of solid scattering particles 325, 327 can remain predominantly exposed to air to promote light scattering. As a result of the light scattering by the particles 325, 327, the colorant disposed in or on the thermal insulating layer 328 is not substantially visible to an observer located on a side of the recording material 320 corresponding to the major surface 320*a*, and the observer would see only the white or light-colored appearance created by the scattering action of the particles 325, 327.

And just as in the bi-layer embodiment, the first and second solid scattering particles 325, 327 of the monolayer embodiment have different melting points: the melting point of the second particles 327 is preferably at least 90° C., or in a range from 80 to 150° C., and the melting point of the first particles 325 is preferably at least 50° C. greater than that of the second particles 327. Thus, when sufficient heat is applied to the top side of the recording material 320, the second solid scattering particles 327, but not the first solid scattering particles 325, melt and fill spaces between the first solid scattering particles, which renders the light-scattering layer 324 substantially transparent. Also, when passing the recording material 320 through a conventional thermal printer, the second solid scattering particles 327, but not the first solid scattering particles 325, rapidly melt and, upon melting, fill spaces between the first solid scattering particles to render the light-scattering layer 324 substantially transparent.

The recording material 320 thus also undergoes a transformation when subjected to sufficient heat and pressure, for a sufficient amount of time, from a thermal print head. The side of the recording medium on which the light-scattering layer is disposed is heated to a temperature between the melting points of the particles 325, 327, such that only the second particles 327 melt. The first particles 325 preferably do not substantially melt, flatten, collapse, or otherwise deform. The melted particles rapidly flow into and fill some or substantially all of the spaces between the first particles 325. Upon cooling (after passing the thermal print head), the melted particles form a solid matrix material in which the first particles 325 are immersed, substantially as shown previously in FIG. 2C. In practice, only a portion of the second particles 327 may melt, and may fill only some of the spaces between the first particles 325. The portion of the direct thermal recording material 320 that undergoes the transformation can be referred to as a printed portion of the recording material.

By interspersing the first and second particles 325, 327 together in a single layer, we reduce the average distance between melted second particles 327 and their nearest neighbor spaces between the first particles 325. This reduced average distance can reduce the response time to achieve transparency, and enable the monolayer recording material 320 to operate at faster printing speeds, e.g. as measured in inches per second (ips). The light-scattering layer 324 may have a thickness in a range from 4 to 40 μm, or 6 to 30 μm, or other suitable thicknesses. The relative proportions of first particles 325 and second particles 327 contained in the light-scattering layer 324 can be selected as desired; however, we have found that a ratio of the first solid scattering particles to the second solid scattering particles, measured in terms of total dry solids (by weight), is preferably in a range from 1 to 3, or from 1.5 to 2.5. The light-scattering layer may consist essentially of the first solid scattering particles, the second solid scattering particles, a binder, and an optional lubricant. The first solid scattering particles, the second solid scattering particles, and the binder may make up at least 95% (total dry solids) of the light-scattering layer.

Besides the bi-layer embodiment of FIG. 2A and the monolayer embodiment of FIG. 3, we also contemplate hybrid embodiments in which some low melting point solid scattering particles (second particles) are interspersed with high melting point solid scattering particles (first particles) in a first porous light-scattering layer, and additional low melting point solid scattering particles are included in a separate light-scattering layer adjacent the first layer.

Embodiments of the type shown in FIGS. 2A and 3 may contain no, or substantially no, hollow scattering particles such as hollow sphere pigments in the light-scattering layers 224, 226, and 324. In some cases, however, it may be beneficial to include some hollow scattering particles in the light scattering layer(s). One reason for doing so relates to the problem of liquid or oil contamination of the recording material. It is common for direct thermal recording media to be used as receipts, tickets, or labels, and the hands or fingers of persons handling such items can sometimes be wet, greasy, oily, or sweaty. If enough of such a liquid contaminant were to contact the exposed major surface 220*a* of FIG. 2A, or the surface 320*a* of FIG. 3, the liquid could wick and penetrate into the porous light scattering layer(s), rendering such layer(s) substantially transparent and thus causing unprinted, wetted areas of the recording material to change appearance from white to black (or otherwise dark), which could cause any previously printed image in such areas to become difficult or impossible to discern. Unlike solid scattering particles, hollow scattering particles maintain most, or at least a substantial portion, of their light scattering capability when they are immersed in a liquid or molten material of similar refractive index. Thus, by including a controlled amount of hollow scattering particles in the light-scattering layer(s) of the disclosed recording materials, the liquid contaminant problem can be improved by ensuring that some light scattering still occurs in unprinted regions of the recording material that are wetted with the liquid.

Figure 4:
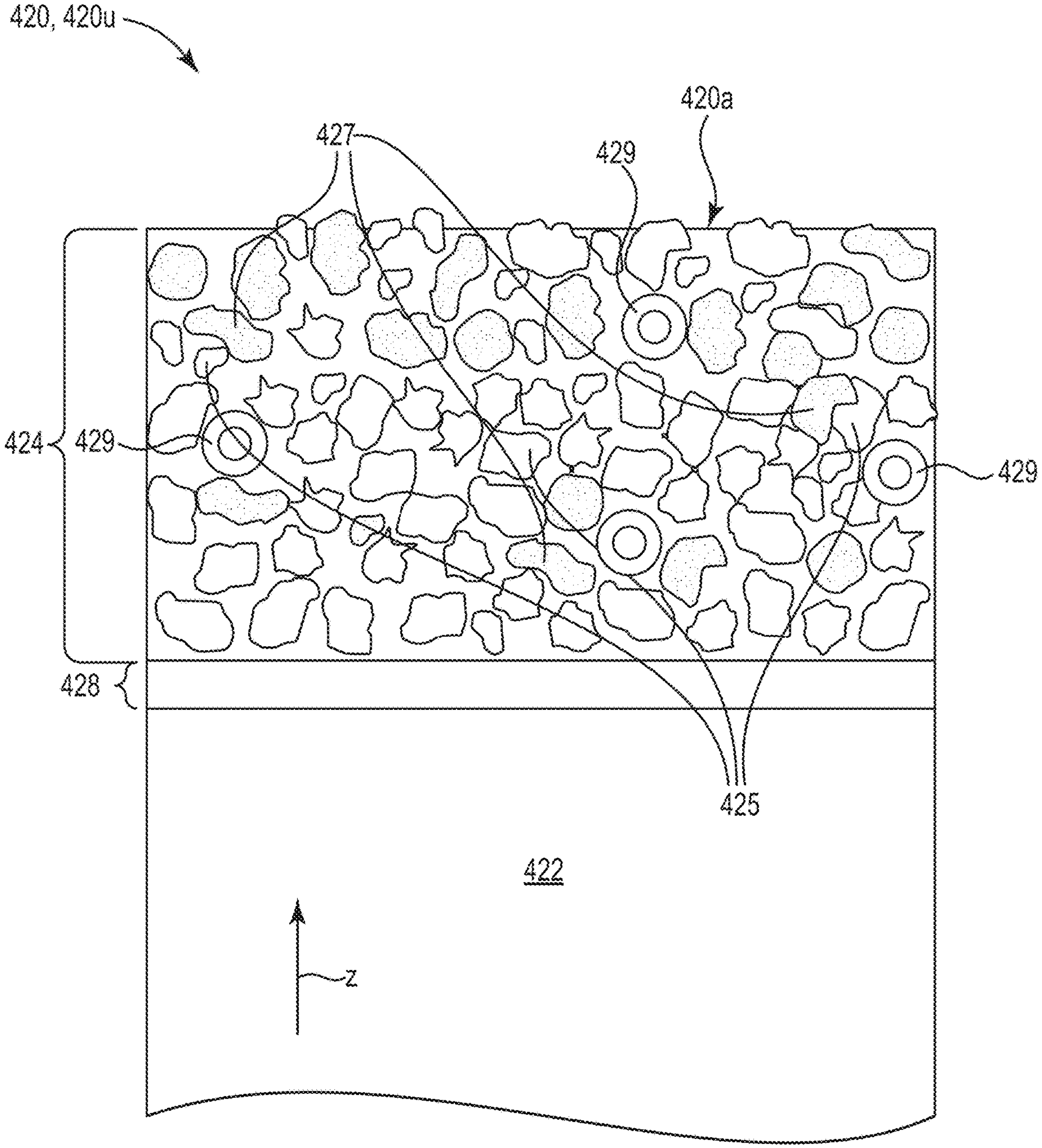
FIG. 4 is a schematic front elevation view, which also serves as a schematic cross-sectional view, of a recording material or medium, or portion thereof, similar to that of FIG. 3, but where the light scattering monolayer includes, in addition to first and second solid scattering particles, some hollow sphere particles, also called hollow sphere pigments.

With this in mind, FIG. 4 shows a direct thermal recording material 420 which is similar to that of FIG. 3, except that some of the first solid scattering particles have been replaced by hollow scattering particles. The recording material 420 is intended to represent the recording material after manufacture but before ever being processed through a thermal printer, but may also represent the recording material after processing through a thermal printer, but at a location that was not substantially subjected to heat from the print head. FIG. 4 may thus also be considered to represent an unprinted portion 420*u* of a direct thermal recording material. The recording material 420 has opposed major surfaces exposed to air, one of which is labeled as major surface 420*a*.

The recording material 420 (420*u*) includes a substrate 422, a light-scattering layer 424, and a thermal insulating layer 428 between the light-scattering layer 424 and the substrate 422. A colorant (not shown separately) is preferably included in or on the thermal insulating layer 428. The light-scattering layer includes first solid scattering particles 425. The recording material 420 also includes second solid scattering particles 427 proximate the light-scattering layer 424. The second solid scattering particles 427 are included in, and dispersed throughout, the light-scattering layer 424 along with the first particles 425. Furthermore, the light-scattering layer 424 also includes hollow light-scattering particles 429 dispersed throughout the layer 424 for the reasons mentioned above. Preferably, to balance the advantages and disadvantages of having hollow scattering particles present in the light-scattering layer, only a controlled amount of such hollow particles are included. For example, the light-scattering layer 424 may contain hollow scattering particles in an amount from 5% to 20% (total dry solids).

Features or elements of the recording material 420 that have counterparts in the recording materials of FIGS. 2A and 3 may be the same as or similar to such counterpart or corresponding elements. Thus, for example, the substrate 422, first solid scattering particles 425, second solid scattering particles 427, and thermal insulating layer 428 may be the same as or similar to the substrate 322, first particles 325, second particles 327, and insulating layer 328, respectively, described above. Furthermore, the light-scattering layer 424 may also be similar to the layer 324 discussed above, except that some hollow scattering particles 429 are present in the layer 424.

The hollow scattering particles 429 are preferably composed of a transparent material. The hollow particles 429 are also preferably of a size that is similar to that of one or both of the solid particles 425, 427. Exemplary hollow particles 429 may be or comprise Ropaque brand EF-500 pigment available from The Dow Chemical Company, or any of the other Ropaque brand of pigments, or the like. The hollow polymeric sphere pigment may have an average particle size (average diameter) of 0.4 micrometers, or in a range from 0.4 to 1.6 micrometers. The hollow polymeric sphere pigment may also have a void volume of 55%, or in a range from 50 to 60%.

The particles 425, 427, 429 may be held together in the layer 424 with a suitable binder material, and the light-scattering layer 424 may have a porous morphology. As a result of light scattering by the particles 425, 427, 429, the colorant disposed in or on the thermal insulating layer 428 is not substantially visible to an observer located on a side of the recording material 420 corresponding to the major surface 420*a*, and the observer would see only the white or light-colored appearance created by the scattering action of the particles 425, 427, 429.

The first and second solid scattering particles 425, 427 have different melting points: the melting point of the second particles 427 is preferably at least 90° C., or in a range from 80 to 150° C., and the melting point of the first particles 425 is preferably at least 50° C. greater than that of the second particles 427. The melting point of the hollow scattering particles 429 is also preferably substantially greater than that of the second particles 427, e.g., at least 50° C. greater similar to the first particles. When sufficient heat is applied to the top side of the recording material 420, the second solid scattering particles 427, but not the first solid scattering particles 425 and not the hollow scattering particles 429, melt and fill spaces between the first solid scattering particles and hollow scattering particles 429, which renders the light-scattering layer 424 substantially transparent as long as the amount of hollow particles 429 is sufficiently low. When passing the recording material 420 through a conventional thermal printer, the second solid scattering particles 427, but not the first solid scattering particles 425 and not the hollow scattering particles 429, rapidly melt and, upon melting, fill spaces between the first solid scattering particles and hollow scattering particles to render the light-scattering layer 424 substantially transparent.

Similar to the other embodiments, the recording material 420 undergoes a transformation when subjected to sufficient heat and pressure, for a sufficient amount of time, from a thermal print head. The side of the recording medium on which the light-scattering layer is disposed is heated to a temperature between the melting points of the particles 425, 427, such that only the second particles 427 melt. The first particles 425, as well as the hollow particles 429, preferably do not substantially melt, flatten, collapse, or otherwise deform. The melted particles rapidly flow into and fill some or substantially all of the spaces between the unmelted particles. Upon cooling (after passing the thermal print head), the melted particles form a solid matrix material in which the first particles 425 and hollow particles 429 are immersed, in similar fashion to FIG. 2C. In practice, only a portion of the second particles 427 may melt, and may fill only some of the spaces between the other particles. The portion of the direct thermal recording material 420 that undergoes the transformation can be referred to as a printed portion of the recording material.

Figure 5:
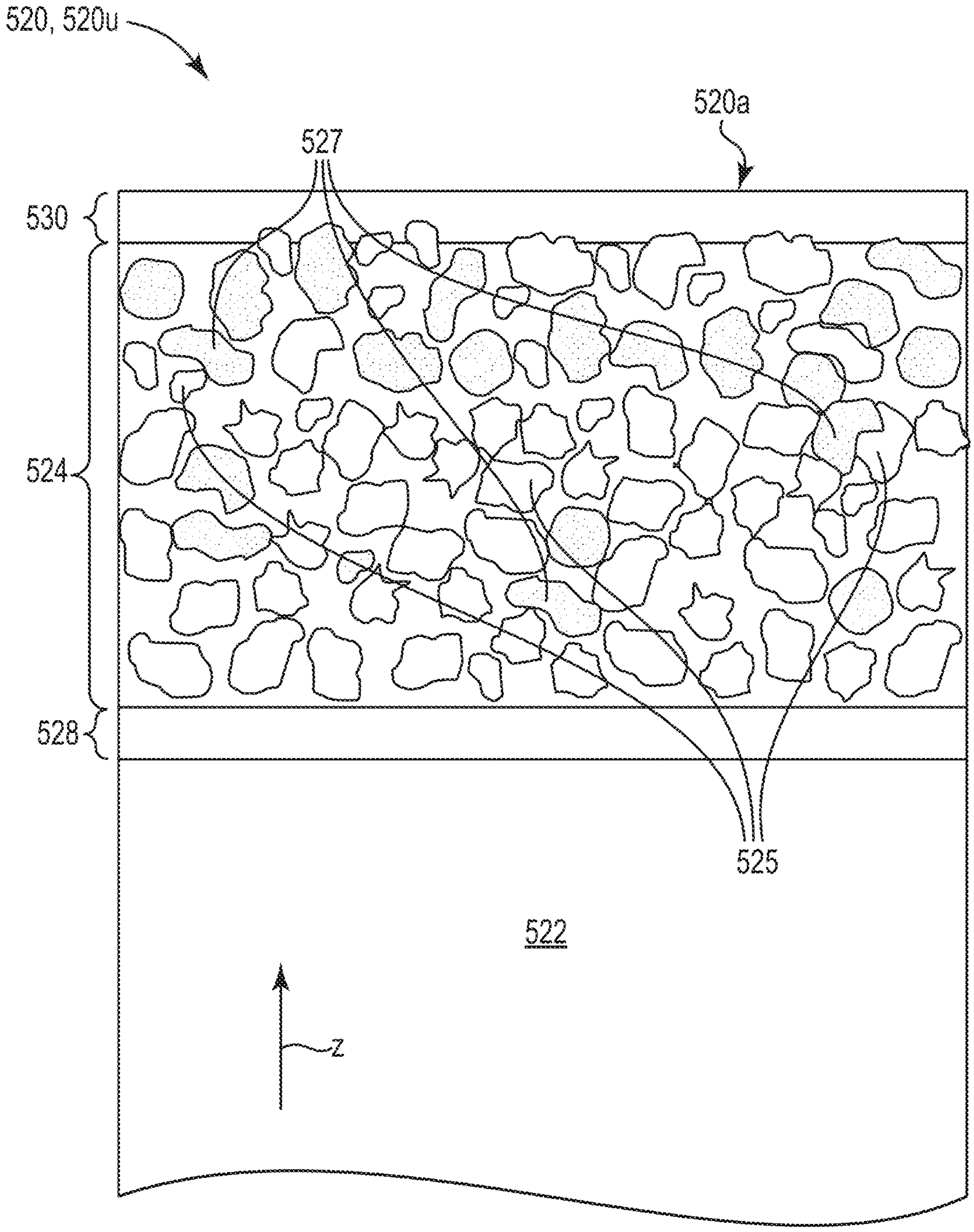
FIG. 5 is a schematic front elevation view, which also serves as a schematic cross-sectional view, of a recording material or medium, or portion thereof, similar to that of FIG. 3, but further including a protective top coat.

Other layers, coatings, and agents can be added to or otherwise included in the disclosed direct thermal recording materials. One such option is a topcoat. A topcoat can be applied to the outermost surface of the recording material, and can protect underlying layers of the recording material from unwanted contaminants or substances. For example, a topcoat can effectively seal a porous light-scattering layer against seepage by oils or other unwanted liquids. In that regard, a topcoat can circumvent the need to add hollow scattering particles as discussed above in connection with FIG. 5. An embodiment of a recording material having such a topcoat is shown in FIG. 5.

In that figure, a direct thermal recording material 520 is shown that is similar to the recording material 320 of FIG. 3, except that a topcoat has been applied to the outermost major surface. The recording material 520 is intended to represent the recording material after manufacture but before ever being processed through a thermal printer, but may also represent the recording material after processing through a thermal printer, but at a location that was not substantially subjected to heat from the print head. FIG. 5 may thus also be considered to represent an unprinted portion 520*u* of a direct thermal recording material. The recording material 520 has opposed major surfaces exposed to air, one of which is labeled as major surface 520*a*.

The recording material 520 includes a substrate 522, a light-scattering layer 524, and a thermal insulating layer 528 between the light-scattering layer 524 and the substrate 522. A colorant is preferably included in or on the thermal insulating layer 528. The light-scattering layer includes first solid scattering particles 525. The recording material 520 also includes second solid scattering particles 527 proximate the light-scattering layer 524. The second solid scattering particles 527 are included in, and dispersed throughout, the light-scattering layer 524 along with the first particles 525. No hollow scattering particles are present in the light-scattering layer 524, however, some may be included if desired. Significantly, the recording material 520 includes a topcoat 530, which may be the outermost layer of the article, and which protects underlying layers of the article.

Features or elements of the recording material 520 that have counterparts in the recording materials of the previously described embodiments may be the same as or similar to such counterpart or corresponding elements. Thus, for example, the substrate 522, light-scattering layer 524, first solid scattering particles 525, second solid scattering particles 527, and thermal insulating layer 528 may be the same as or similar to the substrate 322, light-scattering layer 324, first particles 325, second particles 327, and insulating layer 328, respectively, described above.

The topcoat 530 may be any suitable topcoat of conventional design. The topcoat 530 may for example comprise binders such as modified or unmodified polyvinyl alcohols, acrylic binders, crosslinkers, lubricants, and fillers such as aluminum trihydrate and/or silicas. The topcoat 530 may have a thickness in a range from 0.5 to 2 μm, or other suitable thicknesses.

The functionality of the recording material 520 in the presence of a thermal print head, with regard to the selective change of state of the second solid scattering particles relative to the first solid scattering particles, may be substantially the same as that described above in connection with FIG. 3, and will not be repeated here.

Other properties can also be incorporated into the disclosed direct thermal recording materials. One such property is heat stability for microwave applications and the like. Another property is resistance to strong chemical solvents.

With regard to heat stability, there are some applications in which the direct thermal recording material, after being printed, is likely to experience a heated environment substantially above ambient room temperature. One such application may be where the recording material is in the form of a label attached to a food item that is meant to be heated or cooked in a microwave oven, for example. Another application may be where the recording material is in the form of a label for attachment to a cup or container of coffee or other hot beverage. In applications such as these, it would be undesirable for the entire label (or other piece of direct thermal recording material at issue), as a result of the elevated temperature of its surroundings, to change to black, thus rendering any previously printed information unreadable. A solution to this problem is to select materials for the first and second solid scattering particles whose melting temperatures are sufficiently high to withstand such environments, while still low enough (in the case of the second solid scattering particles) to melt under the influence of the thermal print head. Thus, for example, we may select second solid scattering particles whose melting point is substantially above 100° C., yet also substantially below 200° C., while simultaneously selecting first solid scattering particles whose melting point is at least 50° C. higher than that of the second particles. One suitable combination in this regard is to choose diphenyl sulfone (DPS) as the light-transmissive material for the second solid scattering particles, and polystyrene as the light-transmissive material for the first solid scattering particles. The melting points of these materials are roughly 127° C. for DPS, and 240° C. for polystyrene. Other material combinations are also of course possible.

With regard to solvent resistance, there are some applications in which the direct thermal recording material, after being printed, is likely, or at least has the potential, to be exposed to strong chemical solvents such as isopropanol, ethanol, methanol, acetone, toluene, or the like. To the extent such solvents, or even vapors from such solvents, can dissolve or otherwise attack the first or second solid light-scattering particles of the disclosed embodiments, they can transform an entire label (or other piece of direct thermal recording material at issue) to the black or dark color of the colorant, rendering any previously printed information unreadable. A solution to this problem is to select materials for the first and second solid scattering particles that are impervious to attack by such solvents, while satisfying the other requirements described above for these materials. Examples of such solutions are described and demonstrated below in the Examples section.

The disclosed recording materials may also incorporate other known layers, coatings, and materials. Optical brighteners may for example be used to improve the whiteness of the background color of the recording materials. Lubricants can be used to reduce friction between the recording material and the thermal print head. Slip agents can be used to improve printhead matching characteristics. Adhesive layers, including but not limited to pressure sensitive adhesives (PSAs) or hot melt adhesives, can be included on the back of the recording material to allow attachment to containers, films, or other bodies. Release liners can be included to cover a PSA layer until ready for use. Release coatings may also be applied to the surface for linerless applications that do not require a liner. Furthermore, digital ink receptive layers may be applied to surface(s) of the recording material, such as exposed major surfaces 220*a*, 320*a*, 420*a*, or 520*a*.

A sample was made and tested as a proof-of-concept, and demonstration, of the above-described teachings. The sample was made by starting with a paper substrate, and then hand coating onto one major surface thereof a coating composition that, after drying, became a thermal insulating layer. The coating composition was made of a combination of bulking mineral fillers such as calcined clay and hollow sphere pigments (HSPs). The coating composition also included carbon black, such that the carbon black was distributed throughout the thermal insulating layer, and the thermal insulating layer had a uniformly black appearance. Thereafter, a first light-scattering layer was formed by hand coating, and then drying, a second coating composition onto only a portion of the thermal insulating layer. The first light-scattering layer consisted essentially of first solid scattering particles and polyvinyl alcohol (PVA) as a binder material. The first solid scattering particles were aluminum trihydrate (ATH) having an average particle size of 0.6 μm. In places on the sample where the first light-scattering layer covered the thermal insulating layer, the sample had a light gray appearance. Next, a second light-scattering layer was formed by hand coating, and then drying, a third coating composition onto only a portion of the first light-scattering layer. The second light-scattering layer consisted essentially of second solid scattering particles and polyvinyl alcohol (PVA) as a binder material. The second solid scattering particles were composed of ground diphenoxy ethane (DPE) and had an average diameter of ~0.3 μm. In places on the sample where the second light-scattering layer covered the first light-scattering layer, the sample had a substantially whiter appearance. No other layers were coated onto the sample. As thus fabricated, the sample was a direct thermal recording material having a bi-layer construction in some places or locations on the sample. The sample was then subjected to a series of static print tests: heat was applied to selected portions of the front surface of the sample by contacting the sample for a dwell time of 5 seconds with a heated bar-shaped platen maintained at specific controlled temperatures. Some of the print tests produced dark marks on the sample, as shown in FIG. 6.

Figure 6:
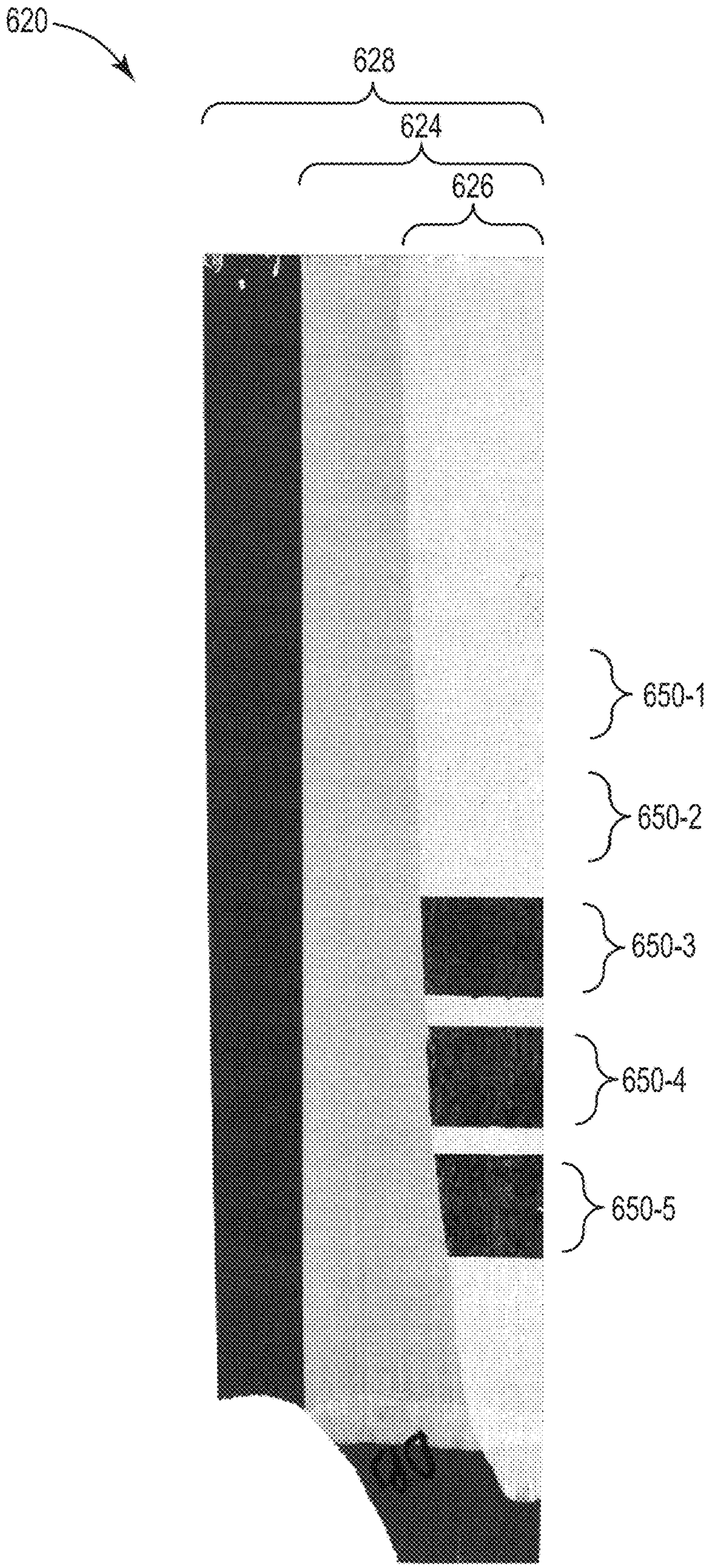
FIG. 6 is a gray scale image of a recording medium that was made and tested, the medium having a bi-layer construction and having been subjected to a static platen bar at different temperatures and different positions on the sample.

In FIG. 6, the proof-of-concept direct thermal recording material 620, as fabricated and tested, is shown as a long strip of material. One entire major surface of the paper substrate (not visible by itself) is coated with the thermal insulating layer having the carbon black, as indicated by reference number 628. Covering part of this thermal insulating layer, and leaving the remainder of the thermal insulating layer exposed, is the first light-scattering layer, indicated by reference number 624. Covering part of this first light-scattering layer, and leaving the reminder of the first light-scattering layer exposed, is the second light-scattering layer, indicated by reference number 626. Note that only in the region 626 does the sample have the construction of a bi-layer direct thermal recording material, since in the remaining regions the sample lacks one or both of the second light-scattering layer and the first light-scattering layer.

The areas of the sample that were contacted by the heated platen are labeled as areas 650-1, 650-2, 650-3, 650-4, and 650-5. In each of these areas, the bar-shaped platen contacted the entire width of the sample. In the area 650-1, the platen temperature was 230° F. (110° C.); in the area 650-2, the platen temperature was 245° F. (118.3° C.); in the area 650-3, the platen temperature was 260° F. (126.7° C.); in the area 650-4, the platen temperature was 275° F. (135° C.); and in the area 650-5, the platen temperature was 300° F. (148.9° C.).

Inspection of the figure reveals that no change in color was observed at any of the tested temperatures in the regions where the first light-scattering layer was exposed, i.e., where the first light-scattering layer was not covered by the second light-scattering layer. This indicates that the scattering properties of the first solid scattering particles did not significantly change at any of the tested temperatures. This is logical insofar as the material of the first solid scattering particles, polystyrene, has a melting point of 240° C., which is much higher than any of the tested temperatures.

Inspection of FIG. 6 also reveals that, with regard to the region on the sample where both the first and second light-scattering layers were present (i.e., region 626), no change in color was observed for temperatures below the melting point (127° C. for DPS) of the second solid scattering particles, i.e., in areas 650-1 or 650-2, but a dramatic change in color was observed for temperatures at or above the melting point of the second solid scattering particles, i.e., in areas 650-3, 650-4, and 650-5.

Figure 7A:
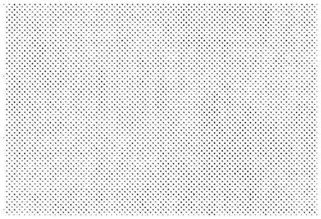
FIG. 7A is a grayscale image of a front view of an unprinted portion (e.g. background region) of a recording medium having a construction similar to FIG. 4.
Figure 7B:
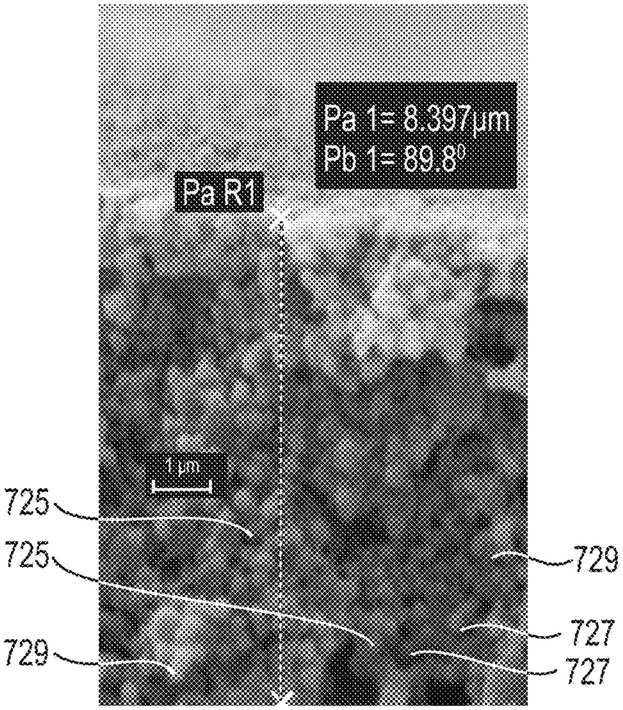
FIG. 7B is a highly magnified SEM image of a small part of the light-scattering monolayer of the recording medium in such unprinted portion.
Figure 8B:
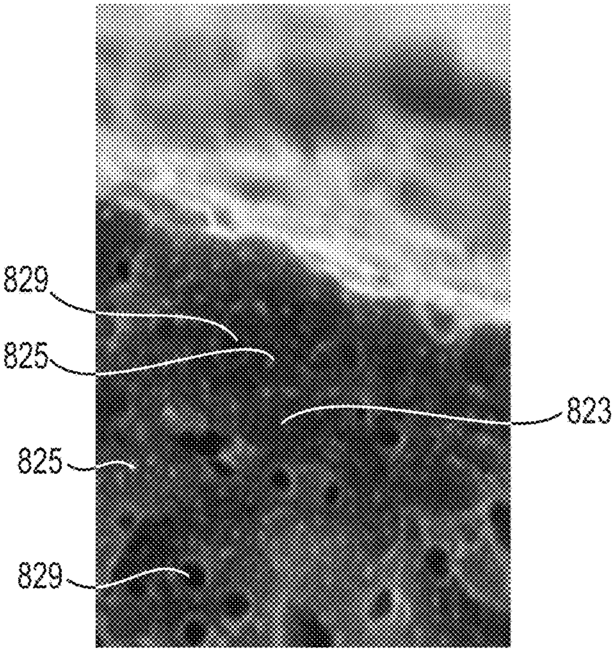
FIG. 8B is a highly magnified SEM image of a small part of the light-scattering monolayer of the recording medium in such printed portion.
Figure 8A:
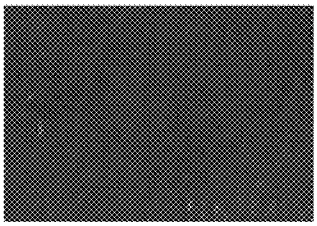
FIG. 8A is a grayscale image of a front view of a printed portion (a rectangular printed region) of the recording medium of FIGS. 7A-7B.

In addition to this proof-of-concept test, other direct thermal recording materials were made and tested, as described further in the Examples section below. Close-up images of some of the samples were taken with a scanning electron microscope (SEM) in order to document the condition of the various particles in both printed areas and unprinted (background) areas from a microscopic viewpoint. In this regard, a sample recording material made in accordance with Example 11 below, which is a monolayer-type direct thermal recording material, was analyzed with the SEM in both a printed area and an unprinted area. The printed area was made using a Zebra™ thermal printer model 140 Xi3 at a print speed of 6 ips and a default factory energy setting of 11.7 mJ/mm$^2$ (corresponds to a temperature of at least 400° F.). FIG. 7A is a grayscale image (not substantially magnified) of an unprinted portion of the sample, and FIG. 8A is a grayscale image (not substantially magnified) of a portion of the sample that was thermally printed. As can be seen by comparing these figures, the thermal printing produced a printed portion that was dramatically darker than the unprinted or background portion of the sample. SEM images of the light-scattering layer (in the unprinted portion) and the modified light-scattering layer (in the printed portion) of the sample were taken and are shown in FIGS. 7B and 8B, respectively. FIG. 7B is thus a close-up image of an unprinted portion of the sample, associated with the grayscale image of FIG. 7A. FIG. 7B shows a portion of the light-scattering layer in an unprinted or background state. Visible in the figure are first solid light-scattering particles 725, second solid light-scattering particles 727, and some hollow light-scattering particles 729.

FIG. 8B is a close-up image of a printed portion of the sample, associated with the grayscale image of FIG. 8A. FIG. 8B shows a portion of the light-scattering layer, as modified and rendered transparent by the application of sufficient heat, in a printed state. Visible in the figure are solid matrix material 823 (melted second solid light-scattering particles), first solid light-scattering particles 825, and hollow light-scattering particles 829.

Figure 9B:
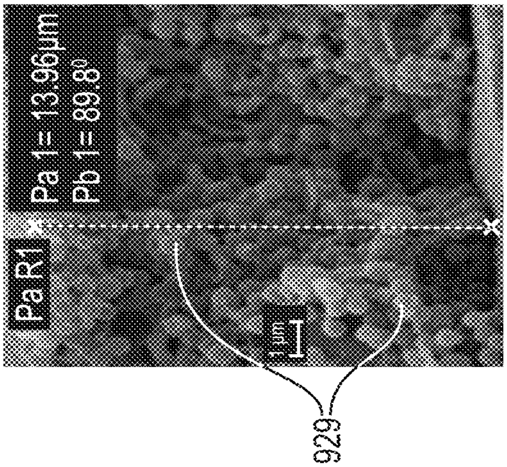
FIGS. 9B, 10B, and 11B are highly magnified SEM images of small parts of the uppermost bead-containing layer of the CE recording material in such portions, respectively.
Figure 9A:
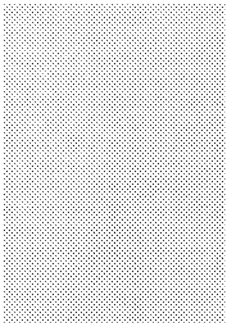
FIGS. 9A, 10A, and 11A are grayscale images of a front view of an unprinted portion, a lightly printed portion, and a heavily printed portion respectively of a Comparative Example (CE) direct thermal recording material.
Figure 10B:
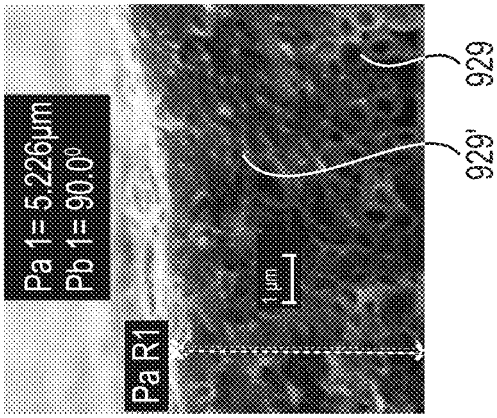
Figure 10A:
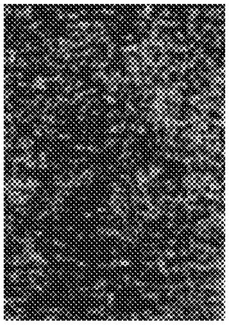
Figure 11B:
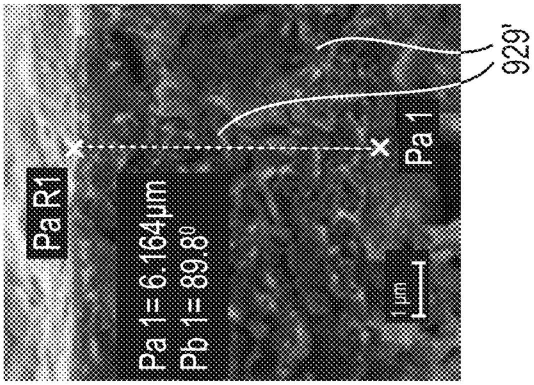
Figure 11A:
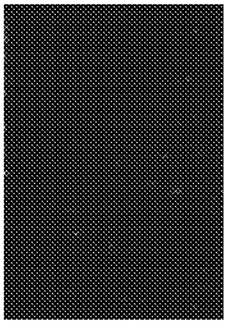

Similar SEM images were taken of a commercially available non-leuco dye direct thermal recording material. This commercially available recording material, which is referred to hereinafter as the Comparative Example (or Comparative Example material or CE material), was a RevealPrint™ product made by Virtual Graphics LLC, Easton, Pa. Portions of the CE material were left unprinted, other portions were lightly printed, and still other portions were heavily printed. The lightly printed portions or areas were made using the same imaging conditions as those of Example 11, while the heavily printed portions or areas were made by running the product a second time through the same thermal printer at the same settings. FIGS. 9A, 10A, and 11A are grayscale images (not substantially magnified) of a front view of the CE material at an unprinted portion, at a lightly printed portion, and at a heavily printed portion, respectively. FIGS. 9B, 10B, and 11B are corresponding highly magnified SEM images, at these respective portions or areas, of an uppermost beaded layer of the material in such portions, respectively. In the figures, 929 refers to hollow spherical particles, and 929' refers to deformed or collapsed hollow particles.

Numerous modifications can be made to the disclosed recording materials. We teach above, for example, that the first and second solid scattering particles can be regularly or irregularly shaped. Besides this, one or both types of particles can be characterized in terms of their particle morphology, i.e., the characteristic form or shape of the individual particles in a given particle group. In a simple morphology, each particle has a topographical boundary defined by a single, closed outer surface—which may be regular or irregular, smooth or jagged—and a uniform or substantially uniform material composition within the bounds of that outer surface. The first and second particles in FIGS. 2A-2D, 3, 4, and 5, for example, are shown as having a simple morphology. Solid, homogeneous microspheres also have a simple morphology. The first and second solid scattering particles disclosed herein can have non-simple morphologies, which we refer to as complex morphologies.

Figure 12:
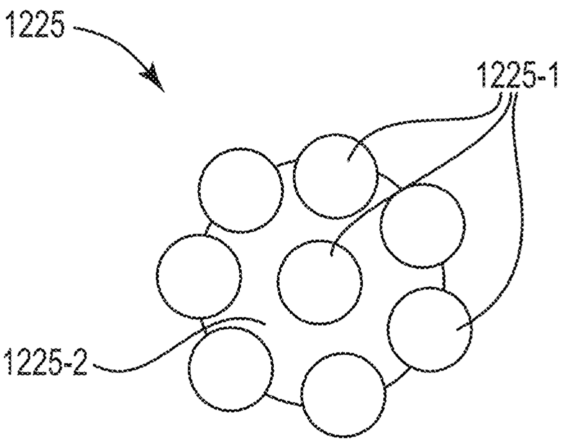
FIG. 12 is a schematic side, top, or bottom view of a particle having a complex morphology, in particular a drupelet morphology.

One such complex morphology is an agglomerated particle, some examples of which are discussed in U.S. Pat. No. 9,663,650 (Jhaveri). A given particle in these cases may thus be a solid agglomeration of at least two types of sub-particles. Small sub-particles composed of a first material may for example be embedded or partially embedded in a larger sub-particle composed of a different second material. In the case of Jhaveri, the first material is a hydrophilic polymer having a first glass transition temperature (Tg), and the second material is hydrophobic polymer having a higher, second Tg. The resulting agglomerated particle may have a drupelet-like surface morphology resembling (on a microscopic scale) that of a blackberry or raspberry, not only in shape but in surface definition, with at least part of at least some of the smaller sub-particles protruding from the surface of the larger sub-particle to give the surface a bumpy, raspberry-like, or blackberry-like appearance. A schematic illustration of a particle having a complex morphology, in particular a drupelet morphology, is shown in FIG. 12. There, a solid agglomerated light-scattering particle 1225 is composed of sub-particles 1225-1 of a first light-transmissive material partially embedded in a larger sub-particle 1225-2 of a different second light-transmissive material. The smaller sub-particles protrude from the surface of the larger sub-particle to provide a bumpy, raspberry-like, or blackberry-like appearance.

Hollow sphere particles or HSP would also be considered to have a complex, though radially symmetric, morphology.

Further Examples and Comparative Example

In accordance with the foregoing teachings, a number of direct thermal recording media samples were fabricated and tested. The CE material referenced above was also subjected to some of the tests.

In preparation for making the example recording materials, a number of dispersion formulations were prepared.

One dispersion, referred to as Dispersion 1A, had the following formulation, where all parts or percentages are understood to be parts per weight, and where the "scattering particle" for this dispersion refers to irregular solid particles of aluminum trihydrate ($Al(OH)_3$, also referred to as aluminum hydroxide, or ATH), of average diameter 0.6 μm, and having a simple morphology, originally obtained from Showa Denko Co Ltd. under product code Higilite™ H-43M and then ground and sieved to the stated size:

Dispersion 1A Formulation

| Material | Parts |
|---|---|
| scattering particle | 40.0 |
| binder, 20% solution of polyvinyl alcohol in water | 20.0 |
| defoaming and dispersing agents | 0.4 |
| water | 39.6 |

Another dispersion, referred to as Dispersion 1B, was the same as Dispersion 1A except that the "scattering particle" was solid spherical particles of polystyrene, of average diameter 0.22 μm, obtained from Trinseo LLC under product code Plastic Pigment 756A.

Another dispersion, referred to as Dispersion 1C, was the same as Dispersion 1A except that the "scattering particle" was solid spherical particles of polystyrene, of average diameter 0.45 μm, obtained from Trinseo LLC under product code Plastic Pigment 772HS.

Another dispersion, referred to as Dispersion 1D, was the same as Dispersion 1A except that the "scattering particle" was solid spherical particles of polyethylene, of average diameter 1.0 μm, obtained from Mitsui Chemical Inc. under product code Chemipearl™ W401.

Another dispersion, referred to as Dispersion 1E, was the same as Dispersion 1A except that the "scattering particle"

was hollow spherical particles (hollow sphere pigment, or HSP), of average diameter 0.4 μm, obtained from The Dow Chemical Co. under product code Ropaque™ TH-500EF.

Another dispersion, referred to as Dispersion 1F, was the same as Dispersion 1A except that the "scattering particle" was modified polystyrene particles in the form of drupelets with an average diameter of 0.75 μm, obtained from BASF Corp. under product code Joncryl™ 633.

Another dispersion, referred to as Dispersion 2A, was the same as Dispersion 1A except that the "scattering particle" was irregular solid particles of 1,2-diphenoxy ethane (DPE, also known as diphenoxyethane), of average diameter ~0.3 μm.

Another dispersion, referred to as Dispersion 2B, was the same as Dispersion 1A except that the "scattering particle" was irregular solid particles of ethylene glycol m-tolyl ether (EGTE), of average diameter ~0.3 μm.

Another dispersion, referred to as Dispersion 2C, was the same as Dispersion 1A except that the "scattering particle" was irregular solid particles of diphenyl sulfone (DPS), of average diameter ~0.3 μm.

For all of the dispersions tested except for Dispersion 1F and Dispersion 1E, the scattering particles were of a simple morphology.

Unless otherwise stated, samples were made by first coating a thermal insulating layer onto a substrate. The substrate used was a 63 g/m$^2$ (gsm) highly refined paper sheet. The thermal insulating layer comprised a mixture of calcined clay such as Ansilex 93 by BASF Corporation, and Ropaque™ TH-1000 hollow sphere pigment (HSP) by The Dow Chemical Company, along with an SBR binder, and was applied at a coat weight of 4.5 gsm. The thermal insulating layer also included carbon black dispersed throughout the layer, at a loading of 6%. After drying, a light-scattering layer was coated atop the thermal insulating layer. The light-scattering layer comprised both first solid scattering particles and second solid scattering particles, the first particles having a higher melting point than the second particles. In some cases the light-scattering layer also comprised hollow spherical particles. After drying, no other coatings were applied to the samples (unless otherwise stated), and the samples were ready for testing. The samples thus were all of the monolayer type, e.g. as shown in FIG. 3 or 4.

Thermal printing was performed on the samples: in some cases using a static bar-shaped platen, at a dwell time of 5 seconds, as described above; and in other cases, using a Zebra™ thermal printer, model 140Xi3, at a speed of 6 ips (unless otherwise stated), and using the default energy setting of the print head, which was 11.7 mJ/mm$^2$. In the case of barcode patterns that were later evaluated, these were printed onto the samples using the Zebra™ printer, unless otherwise stated.

Evaluation of color, e.g. the color of an unprinted area or region on a sample, or the color of a printed area or region on a sample, was measured using a ColorTouch 2 instrument by Technidyne Corporation. This instrument provides measurements of, among other things, CIE whiteness (UV light excluded), and brightness (UV light excluded). Color was also in some cases evaluated with a Gretag Macbeth D19C densitometer, which provides optical density measurements.

The quality of barcode patterns was evaluated using a TruCheck™ barcode verifier operating at 650 nm, a passing result corresponding to an ANSI value of 1.5 or more, and a failing result corresponding to an ANSI value of less than 1.5.

With this background, we may now describe the various samples (examples) that were fabricated according to the foregoing teachings, and the performance results obtained. In a first set of examples, different coating formulations were used to create recording materials that used different materials for the first solid scattering particles, i.e., those having a relatively high melting point. Example 1 used ATH for the first particles, while Example 2 used polystyrene. Both of these examples used DPE for the second solid scattering particles.

For each example, a coating formulation was prepared, and then coated onto the thermal insulating layer that was previously formed on the substrate so as to form a light-scattering layer atop the thermal insulating layer. Coating weights are given below. Examples 1 and 2 used the following formulations:

Coating Formulation—Example 1

| material | Parts |
|---|---|
| Dispersion 1A | 23.0 |
| water | 23.2 |
| binder, 10% solution of polyvinyl alcohol in water | 20.0 |
| Dispersion 2A | 33.8 |

Coating Formulation—Example 2

| material | Parts |
|---|---|
| Dispersion 1B | 41.8 |
| water | 4.4 |
| binder, 10% solution of polyvinyl alcohol in water | 20.0 |
| Dispersion 2A | 33.8 |

These examples were then tested for the color of the background (unprinted area). The quality of a barcode pattern that was thermally printed on the samples using the Zebra™ printer was also evaluated, both from a subjective standpoint of whether the barcode was readable by a human observer, and from an objective standpoint using the TruCheck™ verifier to assess the ANSI value. Results are given in Table 1 below. The results indicate that both ATH and polystyrene are suitable for use as the first solid light-scattering particles, insofar as both provide a human-readable barcode image. The results also indicate that, within the framework of these tests, the polystyrene material is advantageous insofar as it provides a brighter background sheet appearance at the same coat weight (ctwt) or thickness.

TABLE 1

| | 1st particles | | 2nd particles | | | test results: background | | test results: barcode | |
|---|---|---|---|---|---|---|---|---|---|
| Example | material | avg dia (μm) | material | avg dia (μm) | ctwt (gsm) | CIE UV ex. | brightness UV ex. | human readable | ANSI |
| 1 | ATH | 0.6 | DPE | ~0.3 | 5 | 59.78 | 35.56 | pass | fail |
| 2 | polystyrene | 0.22 | DPE | ~0.3 | 5 | 84.26 | 42.06 | pass | fail |

In a next set of examples, different coating weights (coating thicknesses) for the light-scattering layer were tested, and different particle sizes for first solid scattering particles were evaluated. As before, a coating formulation was prepared for each example, and the coating formulation was then coated onto the previously formed thermal insulating layer described above, to form a light-scattering layer atop the thermal insulating layer. Coating weights are given below. Examples 3 through 8 used the following formulations:

Coating Formulation—Examples 3 and 6

| material | Parts |
|---|---|
| Dispersion 1B | 41.8 |
| water | 4.4 |
| binder, 10% solution of polyvinyl alcohol in water | 20.0 |
| Dispersion 2A | 33.8 |

Coating Formulation—Examples 4 and 7

| material | Parts |
|---|---|
| Dispersion 1C | 44.2 |
| water | 2.0 |
| binder, 10% solution of polyvinyl alcohol in water | 20.0 |
| Dispersion 2A | 33.8 |

Coating Formulation—Examples 5 and 8

| material | Parts |
|---|---|
| Dispersion 1F | 51.7 |
| water | 1.7 |
| binder, 10% solution of polyvinyl alcohol in water | 17.3 |
| Dispersion 2A | 29.3 |

These examples were then tested for the color of the background (unprinted area). The quality of a barcode pattern that was thermally printed on the samples using the Zebra™ printer was also evaluated, both from a subjective standpoint of whether the barcode was readable by a human observer, and from an objective standpoint using the Tru-Check™ verifier to assess the ANSI value. Results are given in Table 2 below. In the table, polystyrene* refers to the complex morphology, drupelet-like aggregate particles as distinguished from the simple morphology polystyrene particles. The results indicate that the smaller light-scattering particles are acceptable for human readable applications such as receipts, but the larger particles are preferable in products that require scannable barcodes. The results also indicate that the larger particles improve the background brightness to allow improved scannability of barcodes. The results also indicate that use of drupelet morphology particles can enhance the background brightness.

TABLE 2

| | 1st particles | | 2nd particles | | | test results: background | | test results: barcode | |
|---|---|---|---|---|---|---|---|---|---|
| Example | material | avg dia (μm) | material | avg dia (μm) | ctwt (gsm) | CIE UV ex. | brightness UV ex. | human readable | ANSI |
| 3 | polystyrene | 0.22 | DPE | ~0.3 | 6 | 92.11 | 46.91 | pass | fail |
| 4 | polystyrene | 0.45 | DPE | ~0.3 | 6 | 86.67 | 61.01 | pass | pass |
| 5 | polystyrene* | 0.75 | DPE | ~0.3 | 6 | 85.3 | 65.03 | pass | pass |
| 6 | polystyrene | 0.22 | DPE | ~0.3 | 11 | 96 | 58.04 | pass | pass |
| 7 | polystyrene | 0.45 | DPE | ~0.3 | 11 | 88.79 | 67.12 | pass | pass |
| 8 | polystyrene* | 0.75 | DPE | ~0.3 | 11 | 87.7 | 74.52 | pass | pass |

In a next set of examples, different materials were used for the second solid scattering particles, i.e., those having the relatively low melting point. One objective for this study was to ascertain whether samples could be made that exhibited heat stability or robustness to elevated ambient temperatures, such as may be encountered in microwavable food applications. As before, a coating formulation was prepared for each example, and the coating formulation was then coated onto the previously formed thermal insulating layer described above. Coating weights are given below. Examples 9 through 11 used the following formulations:

Coating Formulation—Example 9

| material | Parts |
|---|---|
| Dispersion 1C | 44.2 |
| water | 2.0 |
| binder, 10% solution of polyvinyl alcohol in water | 20.0 |
| Dispersion 2A | 33.8 |

Coating Formulation—Example 10

| material | Parts |
|---|---|
| Dispersion 1C | 44.2 |
| water | 2.0 |
| binder, 10% solution of polyvinyl alcohol in water | 20.0 |
| Dispersion 2B | 33.8 |

Coating Formulation—Example 11

| material | Parts |
|---|---|
| Dispersion 1C | 44.2 |
| water | 2.0 |
| binder, 10% solution of polyvinyl alcohol in water | 20.0 |
| Dispersion 2C | 33.8 |

These examples were then tested for the color of the background (unprinted area), as well as the color of printed areas made using the bar-shaped platen heated to different temperatures, namely, 200° F. and 300° F. Barcode patterns were also thermally printed onto the samples using the Zebra™ printer at different speed settings (6, 8, and 10 ips), and the resulting barcodes evaluated using the TruCheck™ verifier to assess the ANSI value. Microwave testing was also then done, in which the brightness of a background (unprinted) area was measured before, and then after, exposing the sample to an elevated ambient temperature. The test included applying all 3 example labels to the outside of a 1000 ml glass beaker filled with water. The beaker was placed in a SHARP 1600W/R-23GT laboratory microwave oven at a power setting of 9 for 3.5 minutes. The ANSI value of the 6 ips barcode was also measured for each sample after exposure to the elevated temperature. Results are given in Tables 3a-3b below. The results indicate that appropriate material selection for the second solid scattering particles allows for improved properties such as heat stability, while also providing dynamic imaging on current thermal printers at standard settings and over a range of print speeds from 6 to at least 10 ips.

TABLE 3a

| | 1st particles | | 2nd particles | | | optical density - static | | |
|---|---|---|---|---|---|---|---|---|
| Example | material | avg dia (μm) | material | avg dia (μm) | ctwt (gsm) | bkgnd | 200 F. platen | 300 F. platen |
| 9 | polystyrene | 0.45 | DPE | ~0.3 | 11 | 0.13 | 1.97 | 2.00 |
| 10 | polystyrene | 0.45 | EGTE | ~0.3 | 11 | 0.15 | 1.91 | 2.01 |
| 11 | polystyrene | 0.45 | DPS | ~0.3 | 11 | 0.15 | 0.16 | 1.90 |

TABLE 3b

| | | | | microwave testing | | |
|---|---|---|---|---|---|---|
| | barcode ANSI | | | brightness UV ex. | | ANSI |
| Example | 6 ips | 8 ips | 10 ips | initial | final | final |
| 9 | pass | pass | pass | 59.3 | 6.6 | fail |
| 10 | pass | pass | pass | 59.0 | 8.3 | fail |
| 11 | pass | pass | fail | 57.8 | 56.2 | pass |

In a next set of examples, hollow particles (hollow sphere pigments) were introduced into the light-scattering layer at different incremented amounts, by replacing none, some, or all of the first solid scattering particles with the hollow spherical particles. One objective for this study was to understand the relationship between the amount of hollow particles that were in the light-scattering layer and the print quality at higher print speeds. Another objective was to ascertain whether samples could be made that exhibited good resilience to contamination (wetting) on the front surface with vegetable oil. As before, a coating formulation was prepared for each example, and the coating formulation was then coated onto the previously formed thermal insulating layer described above. The coating weight in each case was 11 gsm. Examples 12 through 18 used the following formulations:

Coating Formulation—Example 12

| material | Parts |
|---|---|
| Dispersion 1C | 44.4 |
| water | 2.0 |
| binder, 10% solution of polyvinyl alcohol in water | 20.0 |
| Dispersion 2A | 33.8 |

Coating Formulation—Example 13

| material | Parts |
|---|---|
| Dispersion 1F | 51.7 |
| water | 1.7 |
| binder, 10% solution of polyvinyl alcohol in water | 17.3 |
| Dispersion 2A | 29.3 |

Coating Formulation—Example 14

| material | Parts |
|---|---|
| Dispersion 1C | 33.9 |
| Dispersion 1E | 14.6 |
| binder, 10% solution of polyvinyl alcohol in water | 19.2 |
| Dispersion 2A | 32.3 |

Coating Formulation—Example 15

| material | Parts |
|---|---|
| Dispersion 1C | 23.9 |
| Dispersion 1E | 27.6 |
| binder, 10% solution of polyvinyl alcohol in water | 18.0 |
| Dispersion 2A | 30.5 |

Coating Formulation—Example 16

| material | Parts |
|---|---|
| Dispersion 1C | 15.1 |
| Dispersion 1E | 39.2 |
| binder, 10% solution of polyvinyl alcohol in water | 17.0 |
| Dispersion 2A | 28.7 |

Coating Formulation—Example 17

| material | Parts |
|---|---|
| Dispersion 1C | 7.1 |
| Dispersion 1E | 49.5 |
| binder, 10% solution of polyvinyl alcohol in water | 16.1 |
| Dispersion 2A | 27.3 |

Coating Formulation—Example 18

| material | Parts |
|---|---|
| Dispersion 1C | 0.0 |
| Dispersion 1E | 58.8 |
| binder, 10% solution of polyvinyl alcohol in water | 15.3 |
| Dispersion 2A | 25.9 |

These examples, as well as the Comparative Example, were then tested for the color of the background (unprinted area), as well as the color of printed areas made using the bar-shaped platen heated to different temperatures, namely, 200° F. and 300° F. Barcode patterns were also thermally printed onto the samples using the Zebra™ printer at different speed settings (6, 8, and 10 ips), and the resulting barcodes evaluated using the TruCheck™ verifier to assess the ANSI value. Vegetable oil testing was also then done, by brushing common vegetable oil (Crisco brand) onto the front surface of the sample where a barcode pattern had been printed under special conditions, the conditions being using an Atlantek™ 400 dynamic response tester, at a setting of 16 $mJ/mm^2$, rather than the Zebra™ printer, in view of the fact that one of the examples and the Comparative Example did not achieve a passing ANSI score on even the slowest setting (6 ips) of the Zebra™ printer, and a passing ANSI score was needed as a baseline for the vegetable oil test. Results are given in Tables 4a-4b below.

Figure 13A:
FIGS. 13A and 13B are grayscale images of recording media that were made and tested by printing images thereon using a conventional POS direct thermal printer, the recording media each having a monolayer construction similar to FIG. 3 or 4, but where FIGS. 13A, 13B differ from each other in the amount of hollow sphere particles used in the scattering layer.
Figure 13B:
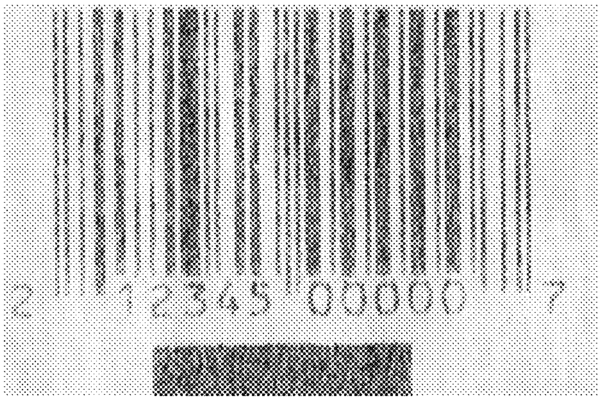
Figure 13C:
FIG. 13C is a grayscale image of a commercially available (comparative example) recording medium that was tested in a manner similar to the samples of FIGS. 13A and 13B.
Figure 14A:
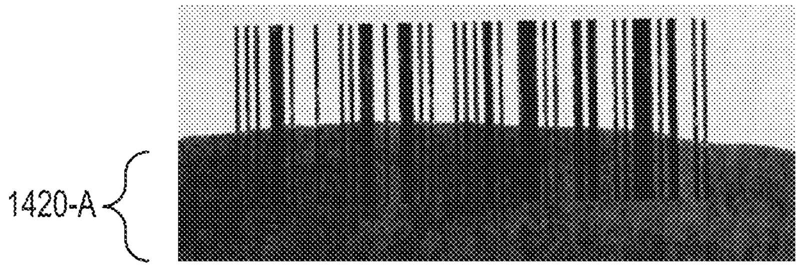
FIGS. 14A-C are grayscale images of recording media that were made and tested by printing images thereon using a conventional POS direct thermal printer, and then applying vegetable oil to a portion of their front surfaces, the recording media each having a monolayer construction similar to FIG. 3 or 4, but where FIGS. 14A-C differ from each other in the amount of hollow sphere particles used in the scattering layer.
Figure 14B:
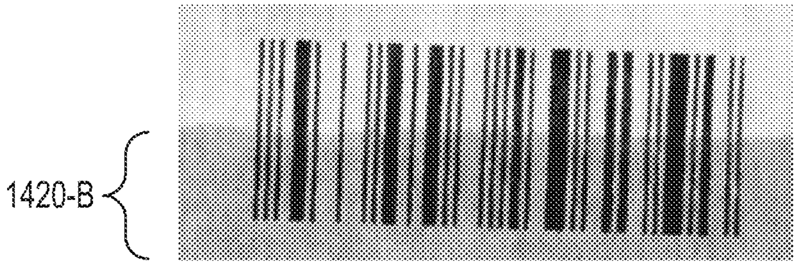
Figure 14C:
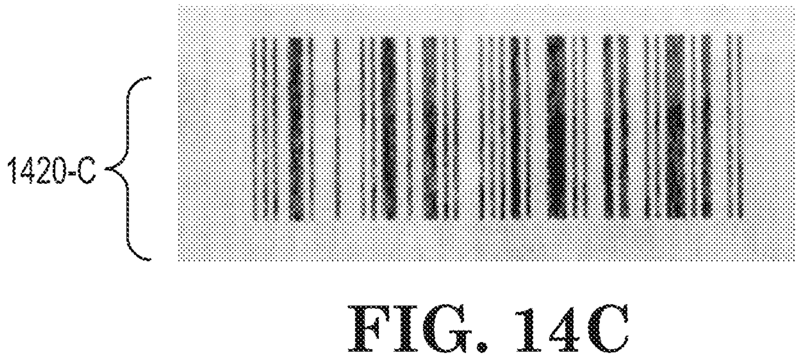
Figure 14D:
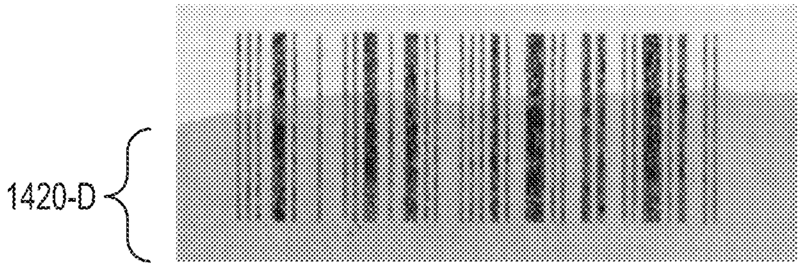
FIG. 14D is a grayscale image of the commercially available (comparative example) recording medium that was tested in a manner similar to the samples of FIGS. 14A-C.

Grayscale images (not substantially magnified) of the barcode patterns printed with the Zebra™ printer at a 6 ips print speed are shown in FIG. 13A for Example 12 (no HSP particles), FIG. 13B for Example 18 (where all first solid scattering particles have been replaced with HSP particles), and FIG. 13C for the CE material. Additional grayscale images (not substantially magnified) of the barcode patterns printed with the Atlantek™ device, and brushed with vegetable oil, are shown at FIG. 14A for Example 12 (no HSP particles, where region 1420-A indicates the area of vegetable oil wetting), FIG. 14B for Example 14 (where region 1420-B indicates the area of vegetable oil wetting), FIG. 14C for Example 18 (where region 1420-C indicates the area of vegetable oil wetting), and FIG. 14D for the Comparative Example (where region 1420-D indicates the area of vegetable oil wetting).

The results indicate that only a limited amount of hollow sphere pigments can be tolerated in the light-scattering layer and still obtain a high quality printed image. The results also indicate that the use of some hollow sphere pigments can be beneficial to produce products having oil resistance. The results also indicate that use of drupelet morphology particles can reduce the optical density (or enhance the brightness) of the background. Furthermore, without wishing to be bound by theory, the generally superior dynamic printing performance of the examples compared to the CE material, at printing speeds of at least 6 through 10 ips and an energy setting of 11.7 $mJ/mm^2$, is believed to be due at least in part to the use of non-polymeric, crystalline organic materials, having no glass transition temperature, for the second solid scattering particles.

TABLE 4a

| | 1st particles | | 2nd particles | | | optical density - static | | |
|---|---|---|---|---|---|---|---|---|
| Example | material | avg dia (μm) | material | avg dia (μm) | solid bead/HSP | bkgnd | 200 F. platen | 300 F. platen |
| 12 | polystyrene | 0.45 | DPE | ~0.3 | 100/0 | 0.13 | 1.95 | 1.95 |
| 13 | polystyrene* | 0.75 | DPE | ~0.3 | 100/0 | 0.09 | 1.90 | 1.95 |
| 14 | polystyrene | 0.45 | DPE | ~0.3 | 80/20 | 0.12 | 1.90 | 1.89 |
| 15 | polystyrene | 0.45 | DPE | ~0.3 | 60/40 | 0.11 | 1.8 | 1.81 |
| 16 | polystyrene | 0.45 | DPE | ~0.3 | 40/60 | 0.11 | 1.81 | 1.82 |
| 17 | polystyrene | 0.45 | DPE | ~0.3 | 20/80 | 0.11 | 1.75 | 1.79 |
| 18 | polystyrene | 0.45 | DPE | ~0.3 | 0/100 | 0.10 | 1.71 | 1.79 |
| CE | | | | | | 0.15 | 1.88 | 2.5 |

TABLE 4b

| | barcode ANSI | | | vegetable oil testing | | |
|---|---|---|---|---|---|---|
| Example | 6 ips | 8 ips | 10 ips | visual | ANSI | bkgnd |
| 12 | pass | pass | pass | fail | fail | 1.46 |
| 13 | pass | pass | pass | Fail | fail | 1.49 |
| 14 | pass | pass | pass | pass | pass | 0.53 |
| 15 | pass | pass | pass | pass | pass | 0.48 |
| 16 | pass | pass | fail | pass | pass | 0.28 |
| 17 | pass | fail | fail | pass | pass | 0.18 |
| 18 | fail | fail | fail | pass | pass | 0.18 |
| CE | fail | fail | fail | pass | fail | 0.46 |

In a next set of examples, different materials were again used for the first solid scattering particles. Example 19 used polystyrene for the first particles, while Example 20 used polyethylene. Both of these examples used DPE for the second solid scattering particles. One objective for this study was to ascertain whether samples could be made that exhibited good resilience to contamination on the front surface with various chemical solvents. As before, a coating formulation was prepared for each example, and the coating formulation was then coated onto the previously formed thermal insulating layer described above. Coating weights are given below. Examples 19 and 20 used the following formulations:

Coating Formulation—Example 19

| material | Parts |
|---|---|
| Dispersion 1C | 44.4 |
| water | 7.3 |
| binder, 10% solution of polyvinyl alcohol in water | 18.0 |
| Dispersion 2A | 30.4 |

Coating Formulation—Example 20

| material | Parts |
|---|---|
| Dispersion 1D | 51.7 |
| water | 0.0 |
| binder, 10% solution of polyvinyl alcohol in water | 18.0 |
| Dispersion 2A | 30.4 |

These examples, as well as the Comparative Example, were then tested for the color of the background (unprinted area). Barcode patterns were thermally printed onto the samples using the Atlantek™ 400 dynamic response tester, at an energy setting of 16 mJ/mm$^2$, rather than the Zebra™ printer. Chemical solvent testing was then done, by brushing one of several different solvents—isopropanol, ethanol, methanol, acetone, and toluene—onto the front surface of the sample where the barcode pattern had been printed. Results are given in Tables 5a-5b below.

Figure 15A:
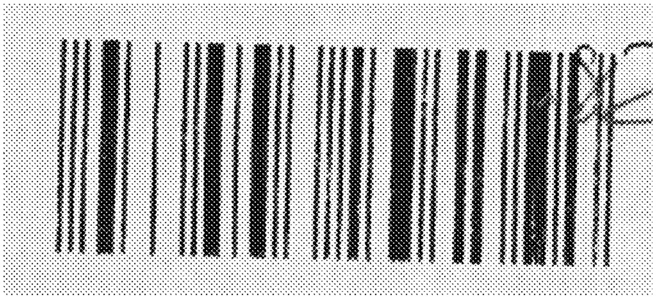
FIG. 15A is a grayscale image of a recording medium having a construction similar to FIG. 3, on which a thermal image in the form of a barcode was made, and then the surface was brushed with isopropanol.
Figure 15B:
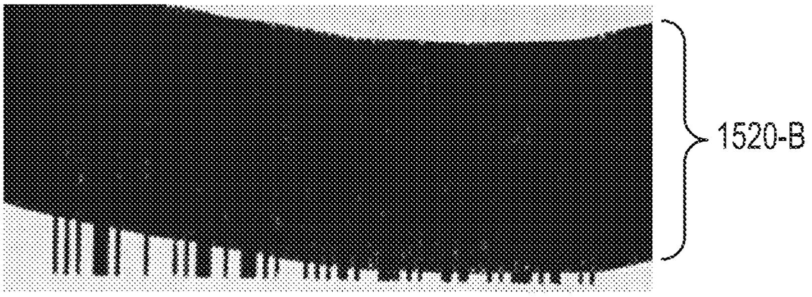
FIGS. 15B and 15C are grayscale images of substantially similar samples that were instead brushed with acetone and toluene, respectively.
Figure 15C:
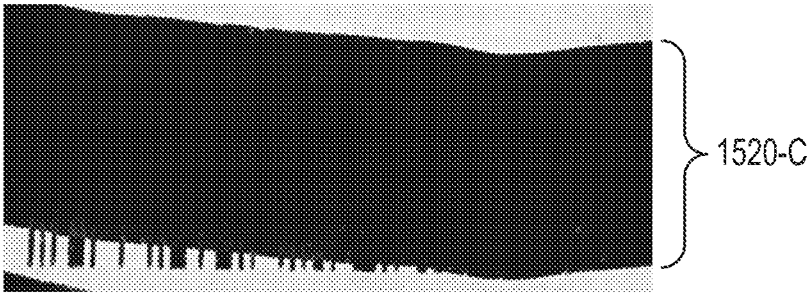
Figure 16A:
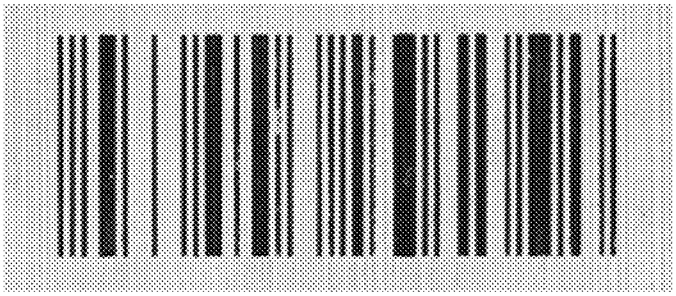
FIG. 16A is a grayscale image of a recording medium having a construction similar to that of FIG. 15A except that it uses a different material for the first solid light-scattering particles, and where the surface was brushed with isopropanol.
Figure 16B:
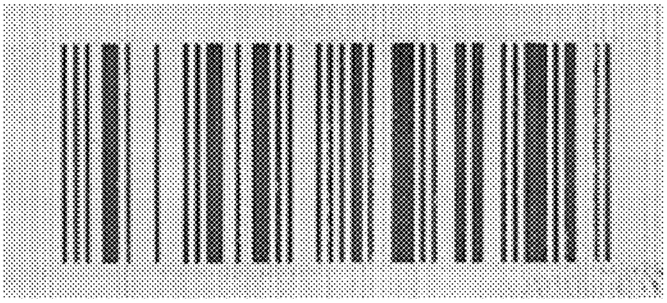
FIGS. 16B and 16C are grayscale images of substantially similar samples that were instead brushed with acetone and toluene, respectively.
Figure 16C:
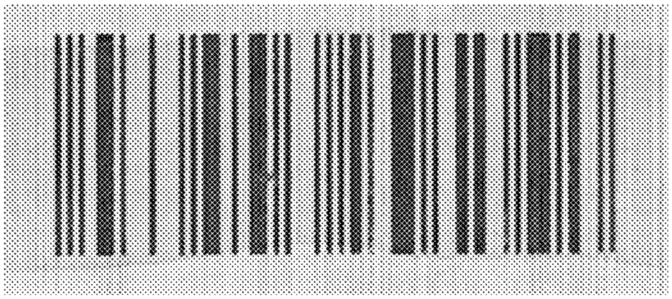
Figure 17A:
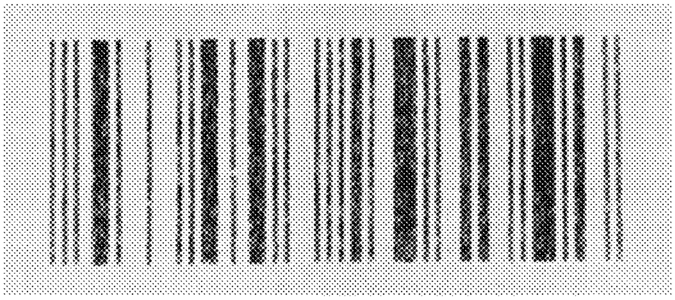
FIG. 17A is a grayscale image of the commercially available (comparative example) recording medium on which a thermal image in the form of a barcode was made, after which the surface was brushed with isopropanol.
Figure 17B:
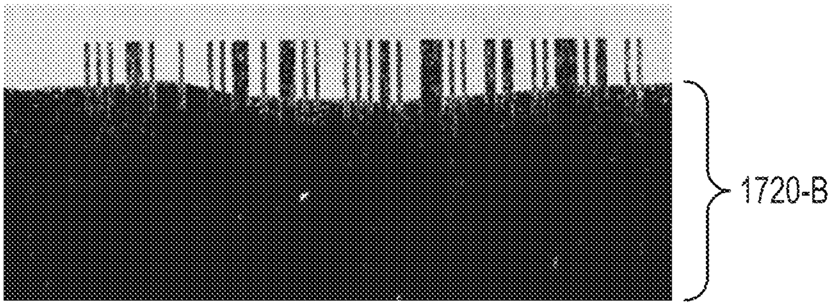
FIGS. 17B and 17C are grayscale images of substantially similar samples that were instead brushed with acetone and toluene, respectively.
Figure 17C:
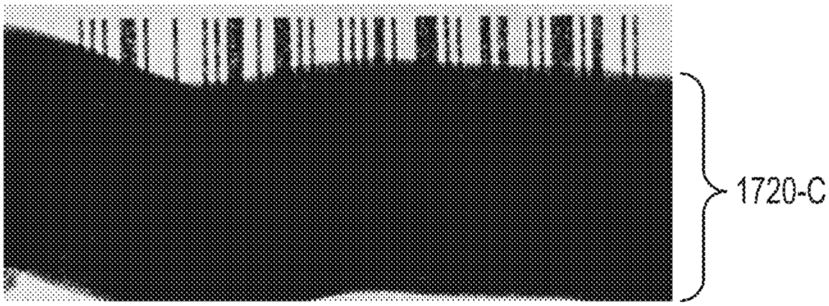

Grayscale images (not substantially magnified) of the barcode patterns printed with the Atlantek™ device are shown at FIGS. 15A-15C for Example 19 (isopropanol wetting in FIG. 15A, acetone wetting in FIG. 15B, seen at region 1520-B, and toluene wetting in FIG. 15C, seen at region 1520-C), and at FIGS. 16A-16C for Example 20 (isopropanol wetting in FIG. 16A, acetone wetting in FIG. 16B, and toluene wetting in FIG. 16C), and at FIGS. 17A-17C for the Comparative Example (isopropanol wetting in FIG. 17A, acetone wetting in FIG. 17B, seen at region 1720-B, and toluene wetting in FIG. 17C, seen at region 1720-C).

The results indicate that chemical solvent resistance can be achieved by appropriate selection of the material of the first solid light-scattering particles.

TABLE 5a

| | 1st particles | | 2nd particles | | |
|---|---|---|---|---|---|
| Example | material | avg dia (μm) | material | avg dia (μm) | ctwt (gsm) |
| 19 | polystyrene | 0.45 | DPE | ~0.3 | 11 |
| 20 | polyethylene | 1.0 | DPE | ~0.3 | 11 |
| CE | | | | | |

TABLE 5b

| | | initial | | final | |
|---|---|---|---|---|---|
| Example | solvent | bkgnd | ANSI | bkgnd | ANSI |
| 19 | isopropanol | 0.14 | pass | 0.14 | pass |
| | ethanol | 0.15 | pass | 0.14 | pass |
| | methanol | 0.13 | pass | 0.13 | pass |
| | acetone | 0.14 | pass | 1.83 | fail |
| | toluene | 0.14 | pass | 1.89 | fail |
| 20 | isopropanol | 0.18 | pass | 0.18 | pass |
| | ethanol | 0.19 | pass | 0.18 | pass |
| | methanol | 0.18 | pass | 0.18 | pass |
| | acetone | 0.18 | pass | 0.17 | pass |
| | toluene | 0.17 | pass | 0.21 | pass |
| CE | isopropanol | 0.16 | pass | 0.16 | pass |
| | ethanol | 0.16 | pass | 0.16 | pass |
| | methanol | 0.15 | pass | 0.16 | pass |
| | acetone | 0.16 | pass | 1.93 | fail |
| | toluene | 0.15 | pass | 1.98 | fail |

Numerous changes, substitutions, revisions, and extensions can be made to the disclosed articles, systems, and methods. For example, although thermal printing of the disclosed recording materials is described above as being carried out with direct thermal printers, in which the direct thermal recording material makes physical contact with, and presses against, the thermal print head while the recording material passes through the printer, other thermal printing techniques can also be used. Suitable alternatives include non-contact printing techniques. In one such technique, one or more lasers or other suitable light sources heat the material at selected print locations by illuminating the sample with laser radiation or the like, without making contact at those locations with any heat source. In such non-contact printing systems, the laser may have a laser output energy rating of 1 watt or less.

Impact non-thermal printing techniques may also be used with the disclosed recording materials.

In another extension of the above teachings, two-stage or two-color embodiments can also be practiced. In one such embodiment, the recording material 320 of FIG. 3 can be modified by adding atop the light-scattering layer 324 a second light-scattering layer of the same type as layer 324, but also adding a secondary colorant to one of the two light-scattering layers. The secondary colorant may be different from the colorant used with the thermal insulating layer 328, for example, the original colorant of the layer 328 may be black, whereas the colorant in the light-scattering layer may be red, blue, or another color that encompasses less than all of the visible light spectrum. The two light-scattering layers may be configured such that a one dose of heat or energy causes the upper (outermost) light-scattering layer, but not the lower light-scattering layer, to become transparent, whereas a different dose (e.g. higher temperature or greater energy) causes both light-scattering layers to become transparent. By appropriate selection of the colorants and the scattering layer features such as layer thickness and composition of the various scattering particles, two different colors can be achieved at a given print location depending on the heat/energy dose delivered to the material. In one embodiment, no colorant may be included in the upper light-scattering layer, the secondary colorant can be included in the lower light-scattering layer, and the original colorant (e.g. black) can be included in the thermal insulating layer, such that a low energy dose causes only the upper light-scattering layer to become transparent, thus exposing the secondary color, and a high energy dose causes both light-scattering layers to become transparent (to the extent possible given the presence of the secondary colorant), exposing the original (e.g. black) color.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

The following is a non-limiting list of items of the present disclosure.

Item 1. A recording medium, comprising:
- a substrate;
- a first light-scattering layer carried by the substrate and including first solid scattering particles having a first melting point; and
- a plurality of second solid scattering particles proximate the first light-scattering layer, the second solid scattering particles having a second melting point lower than the first melting point;
- wherein the first light-scattering layer is porous, and the second solid scattering particles are disposed to, upon melting, fill spaces between the first solid scattering particles.

Item 2. The medium of item 1, further comprising a thermal insulating layer between the first light-scattering layer and the substrate.

Item 3. The medium of any preceding item, further comprising a colorant disposed beneath the first light-scattering layer.

Item 4. The medium of any preceding item, wherein the colorant is included on, in, or under the thermal insulating layer.

Item 5. The medium of any preceding item, wherein applying sufficient heat at selected print locations to a side of the recording medium on which the first light-scattering layer resides causes the second particles, but not the first particles, to melt at the selected print locations, such that the second particles, upon melting, fill spaces between the first particles to render the first light-scattering layer substantially transparent in the selected print locations.

Item 6. The medium of any preceding item, wherein the recording medium is configured such that passing the recording medium through a thermal printer causes the second particles, but not the first particles, to melt at selected print locations, such that the second particles, upon melting, fill spaces between the first particles to render the first light-scattering layer substantially transparent at the selected print locations.

Item 7. The medium of items 5 or 6, wherein the colorant becomes visible at the selected print locations but remains obscured by other portions of the first light-scattering layer.

Item 8. The medium of any preceding item, wherein upon heating a side of the recording medium on which the first light-scattering layer is disposed to a temperature between the first and second melting points, the second particles melt and fill spaces between the first particles to render the first light-scattering layer substantially transparent.

Item 9. The medium of any preceding item, wherein the recording medium is configured for use with a thermal printer wherein localized heat from the thermal printer renders the first light-scattering layer substantially transparent so as to provide a printed mark.

Item 10. The medium of any preceding item, wherein a print quality of the recording medium when used with a thermal printer energy setting of 11.7 $mJ/mm^2$ at a print speed of 6 inches per second (ips) is characterized by an ANSI value of at least 1.5.

Item 11. The medium of item 10, wherein the print quality ANSI value is also at least 1.5 at a print speed of 8 ips.

Item 12. The medium of item 11, wherein the print quality ANSI value is also at least 1.5 at a print speed of 10 ips.

Item 13. The medium of any preceding item, wherein the first particles have a first average size, the second particles have a second average size, and the second average size is in a range from 0.2 to 1 micrometer.

Item 14. The medium of item 13, wherein the first average size is also in the range from 0.2 to 1 micrometer.

Item 15. The medium of any preceding item, wherein the second melting point is at least 80° C. or at least 90° C.

Item 16. The medium of any preceding item, wherein the second melting point is in a range from 80 to 150° C.

Item 17. The medium of any preceding item, wherein the first melting point is at least 50° C. greater than the second melting point.

Item 18. The medium of any preceding item, wherein the second particles are dispersed throughout the first light-scattering layer.

Item 19. The medium of item 18, wherein the first particles, the second particles, and a binder make up at least 95% (total dry solids) of the first light-scattering layer.

Item 20. The medium of item 19, wherein the first light-scattering layer consists essentially of the first and second particles, the binder, and an optional lubricant.

Item 21. The medium of any preceding item, wherein the first light-scattering layer is exposed to air and contains hollow particles from 5% to 20% (total dry solids).

Item 22. The medium of any items 1-20, further including a topcoat exposed to air, and disposed directly or indirectly on the first light-scattering layer.

Item 23. The medium of any items 1-17 or 22, wherein the second particles are disposed in a second light-scattering layer adjacent the first light-scattering layer.

Item 24. The medium of any preceding item, wherein the first light-scattering layer contains substantially no hollow particles, and the second light-scattering layer contains substantially no hollow particles.

Item 25. The medium of any preceding item, wherein the first light-scattering layer is substantially devoid of leuco dyes and acidic developers.

Item 26. The medium of any preceding item, wherein the recording medium is substantially devoid of leuco dyes and acidic developers.

Item 27. The medium of any preceding item, wherein the second particles comprise a non-polymeric crystalline organic material.

Item 28. The medium of any preceding item, wherein the second particles comprise DPS, DPE, EGTE, or BON.

Item 29. The medium of any preceding item, wherein the first particles are polymeric or inorganic.

Item 30. The medium of item 29, wherein the first particles comprise ATH, calcium carbonate, polyethylene, polystyrene, and/or silica.

Item 31. The medium of any preceding item, wherein the first particles are not soluble in acetone.

Item 32. The medium of any preceding item, wherein neither the first particles nor the second particles are chemically reactive.

Item 33. The medium of any preceding item, wherein neither the first particles nor the second particles contain any chemical functional group.

Item 34. The medium of any preceding item, wherein a ratio of the first particles to the second particles, measured in terms of total dry solids, is from 1 to 3.

Item 35. The medium of item 34, wherein the ratio is from 1.5 to 2.5.

Item 36. The medium of any preceding item, wherein the first particles have a drupelet morphology or other complex morphology.

Item 37. A recording medium, comprising:

a substrate;

a light-scattering layer carried by the substrate, the light-scattering layer being substantially devoid of leuco dyes and acidic developers; and a colorant carried by the substrate and disposed between the substrate and the light-scattering layer;

wherein the recording medium is configured for use with a thermal printer, and wherein a print quality of the recording medium when used with a thermal printer energy setting of 11.7 $mJ/mm^2$ at a print speed of 6 inches per second (ips) is characterized by an ANSI value of at least 1.5.

Item 38. The medium of item 37, wherein localized heat from the thermal printer renders the light-scattering layer substantially transparent so as to provide a printed mark.

Item 39. The medium of items 37 or 38, further comprising a thermal insulating layer between the light-scattering layer and the substrate, and wherein the colorant is disposed on, in, or under the thermal insulating layer.

Item 40. The medium of any of items 37-39, wherein the light-scattering layer includes first solid scattering particles having a first melting point and second solid scattering particles having a second melting point lower than the first melting point.

Item 41. The medium of item 40, wherein the second particles comprise a non-polymeric crystalline organic material.

Item 42. The medium of any of items 37-41, wherein the print quality is also characterized by the ANSI value of at least 1.5 at a print speed of 8 ips or 10 ips.

Item 43. The medium of any of items 40-42, wherein the first particles have a first average size, the second particles have a second average size, and the first and second average sizes are both within a range from 0.2 to 1 micrometer.

Item 44. A recording medium, comprising:

a flexible substrate;

a light-scattering layer carried by the substrate and including first solid scattering particles having a first melting point and second solid scattering particles having a second melting point, the light-scattering layer being porous and substantially devoid of leuco dyes and acidic developers; and a thermal insulating layer and a colorant disposed between the substrate and the light-scattering layer; and wherein the second melting point is at least 80° C. and the first melting point is at least 50° C. greater than the second melting point; and wherein the recording medium is configured for use with a thermal printer to provide thermally-induced images resulting from selective melting of the second solid scattering particles to fill spaces between the first solid scattering particles, and wherein a print quality of the recording medium when used with a thermal printer energy setting of 11.7 mJ/mm$^2$ at a print speed of 6 inches per second (ips) is characterized by an ANSI value of at least 1.5.

Item 45. The medium of item 44, wherein localized heat from the thermal printer renders the light-scattering layer substantially transparent so as to provide a printed mark.

Item 46. The medium of items 44 or 45, wherein the second particles comprise a non-polymeric crystalline organic material.

Item 47. The medium of any of items 44-46, wherein the print quality is also characterized by the ANSI value of at least 1.5 at a print speed of 8 ips or 10 ips.

Item 48. The medium of any of items 44-47, wherein the first particles have a first average size, the second particles have a second average size, and the first and second average sizes are both within a range from 0.2 to 1 micrometer.

Item 49. A recording medium, comprising:

a flexible substrate;

a first light-scattering layer carried by the substrate and including first solid scattering particles having a first melting point, the first light-scattering layer being porous;

a second light-scattering layer including second solid scattering particles having a second melting point, the second light-scattering layer being disposed proximate the first light-scattering layer; and a thermal insulating layer and a colorant disposed between the first light-scattering layer and the substrate;

wherein the second melting point is at least 80° C. and the first melting point is at least 50° C. greater than the second melting point;

wherein the first and second light-scattering layers are substantially devoid of leuco dyes and acidic developers; and wherein the recording medium is configured for use with a thermal printer to provide thermally-induced images resulting from selective melting of the second solid scattering particles to fill spaces between the first solid scattering particles, and wherein a print quality of the recording medium when used with a thermal printer energy setting of 11.7 mJ/mm$^2$ at a print speed of 6 inches per second (ips) is characterized by an ANSI value of at least 1.5.

Item 50. The medium of item 49, wherein localized heat from the thermal printer renders the first light-scattering layer substantially transparent so as to provide a printed mark.

Item 51. The medium of items 49 or 50, wherein the second particles comprise a non-polymeric crystalline organic material.

Item 52. The medium of any of items 49-51, wherein the print quality is also characterized by the ANSI value of at least 1.5 at a print speed of 8 ips or 10 ips.

Item 53. The medium of any of items 49-52, wherein the first particles have a first average size, the second particles have a second average size, and the first and second average sizes are both within a range from 0.2 to 1 micrometer.

Item 54. A method of making a recording medium, comprising:

providing a substrate and a colorant;

forming a first light-scattering layer atop the substrate and the colorant, the first light-scattering layer being porous and comprising first solid scattering particles having a first melting point; and as part of the forming the first light-scattering layer, or in a separate step of forming a second light-scattering layer, providing a plurality of second solid scattering particles proximate the first light-scattering layer, the second solid scattering particles having a second melting point;

wherein the second melting point is sufficiently lower than the first melting point such that the recording medium is adapted for dynamic thermal printing wherein the second solid scattering particles, but not the first solid scattering particles, melt at selected print locations, and the second solid scattering particles, when melted, fill spaces between the first solid scattering particles.

Item 55. The method of item 54, further comprising forming a thermally insulating layer on the substrate before forming the first light-scattering layer, such that the thermal insulating layer is disposed between the first light-scattering layer and the substrate, and wherein the colorant is provided in, on, or under the thermally insulating layer.

Item 56. The method of items 54 or 55, wherein the second particles comprise a non-polymeric crystalline organic material.

Item 57. The method of any of items 54-56, wherein the recording medium so made provides a print quality characterized by an ANSI value of at least 1.5 when used with a thermal printer energy setting of 11.7 mJ/mm$^2$ at a print speed of 6, 8, or 10 ips.

Item 58. The method of any of items 54-57, wherein the first particles have a first average size, the second particles have a second average size, and the first and second average sizes are both within a range from 0.2 to 1 micrometer.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A method of making a recording medium, comprising:

providing a substrate and a colorant;

forming a thermal insulating layer atop the substrate;

forming a first light-scattering layer atop the thermal insulating layer, the first light-scattering layer being porous and comprising first solid scattering particles having a first melting point; and as part of forming the first light-scattering layer, or in a separate step of forming a second light-scattering layer, providing a plurality of second solid scattering particles not being chemically reactive, and the second solid scattering particles having a second melting point;

wherein the second melting point is lower than the first melting point such that the recording medium is adapted for dynamic thermal printing wherein the second solid scattering particles, but not the first solid scattering particles, melt at selected print locations, and the second solid scattering particles, when melted, fill spaces between the first solid scattering particles; and wherein providing the colorant includes providing the colorant in the thermal insulating layer.

2. The method of claim 1, wherein providing the colorant in the thermal insulating layer includes dispersing the colorant throughout the thermal insulating layer.

3. The method of claim 1, wherein the substrate comprises a polymeric film.

4. The method of claim 3, wherein the polymeric film comprises polypropylene.

5. The method of claim 1, wherein the second particles comprise a non-polymeric crystalline organic material.

6. The method of claim 1, wherein the recording medium so made provides a print quality characterized by an ANSI value of at least 1.5 when used with a thermal printer energy setting of 11.7 $mJ/mm^2$ at a print speed of 6, 8, or 10 ips.

7. A method of making a recording medium, comprising:

providing a substrate;

forming a thermal insulating layer atop the substrate;

forming a light-scattering layer atop the thermal insulating layer, the light-scattering layer being porous and comprising first solid scattering particles having a first melting point;

as part of forming the light-scattering layer, providing a plurality of second solid scattering particles proximate the light-scattering layer, the first and second solid scattering particles not being chemically reactive, the second solid scattering particles having a second melting point; and providing a colorant beneath the light scattering layer;

wherein the second melting point is lower than the first melting point such that the recording medium is adapted for dynamic thermal printing wherein the second solid scattering particles, but not the first solid scattering particles, melt at selected print locations, and the second solid scattering particles, when melted, fill spaces between the first solid scattering particles.

8. The method of claim 7, wherein providing the colorant includes providing the colorant on the thermal insulating layer.

9. The method of claim 7, wherein providing the colorant includes providing the colorant in the thermal insulating layer.

10. The method of claim 9, wherein providing the colorant in the thermal insulating layer includes dispersing the colorant throughout the thermal insulating layer.

11. The method of claim 7, wherein providing the colorant includes providing the colorant under the thermal insulating layer.

12. The method of claim 11, wherein forming the thermal insulating layer includes forming the thermal insulating layer atop the colorant.

13. The method of claim 7, wherein the substrate comprises a polymeric film.

14. The method of claim 13, wherein the polymeric film comprises polypropylene.

15. The method of claim 7, wherein the second particles comprise a non-polymeric crystalline organic material.

16. The method of claim 7, wherein the recording medium so made provides a print quality characterized by an ANSI value of at least 1.5 when used with a thermal printer energy setting of 11.7 $mJ/mm^2$ at a print speed of 6, 8, or 10 ips.

* * * * *